US008165400B2

(12) United States Patent
Okumura

(10) Patent No.: US 8,165,400 B2
(45) Date of Patent: Apr. 24, 2012

(54) IMAGE DATA PROCESSING SYSTEM AND IMAGE DATA PROCESSING METHOD FOR GENERATING ARRANGEMENT PATTERN REPRESENTING ARRANGEMENT OF REPRESENTATIVE VALUE IN PIXEL BLOCK INCLUDING PIXEL IN IMAGE

(75) Inventor: Haruhiko Okumura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 891 days.

(21) Appl. No.: 12/210,606

(22) Filed: Sep. 15, 2008

(65) Prior Publication Data

US 2009/0080776 A1 Mar. 26, 2009

(30) Foreign Application Priority Data

Sep. 25, 2007 (JP) ................................ P2007-246598

(51) Int. Cl.
*G06K 9/46* (2006.01)
*G06K 9/00* (2006.01)
*G06K 9/36* (2006.01)

(52) U.S. Cl. ........................................ 382/190; 382/173

(58) Field of Classification Search .................. 382/158, 382/159, 164, 171–173, 190, 195, 199, 218, 382/224, 225, 228, 229
See application file for complete search history.

(56) References Cited

U.S. PATENT DOCUMENTS

| | | | | |
|---|---|---|---|---|
| 4,682,365 | A * | 7/1987 | Orita et al. | 382/159 |
| 6,344,850 | B1 | 2/2002 | Okumura et al. | |
| 6,347,156 | B1 * | 2/2002 | Kamada et al. | 382/237 |
| 7,054,485 | B2 * | 5/2006 | Li et al. | 382/172 |
| 2004/0042650 | A1 * | 3/2004 | Ii et al. | 382/158 |
| 2007/0269118 | A1 | 11/2007 | Sasaki et al. | |
| 2009/0080776 | A1 * | 3/2009 | Okumura | 382/190 |
| 2010/0135578 | A1 * | 6/2010 | Nakamura | 382/190 |

FOREIGN PATENT DOCUMENTS

JP 2000-20031 1/2000

* cited by examiner

*Primary Examiner* — Amir Alavi

(74) *Attorney, Agent, or Firm* — Oblon, Spivak, McClelland, Maier & Neustadt, L.L.P.

(57) ABSTRACT

An image data processing system includes an extracting unit extracting from an image signal corresponding to one image a signal corresponding to a pixel block including plural pixels in the image, a threshold calculating unit calculating a threshold for classifying the plural pixels into plural segments by linear calculation of display values of the plural pixels, a representative value calculating unit calculating plural representative values corresponding to the plural segments, a generating unit generating an arrangement pattern representing an arrangement of the representative values in the pixel block, and a transmitting unit transmitting the representative values and the arrangement pattern.

16 Claims, 22 Drawing Sheets

FIG. 3A

| | | | |
|---|---|---|---|
| 200 | 149 | 90 | 50 |
| 200 | 146 | 92 | 50 |
| 200 | 152 | 90 | 50 |
| 200 | 144 | 99 | 50 |

AVERAGE 123

FIG. 3B

| | | | |
|---|---|---|---|
| 1 | 1 | 0 | 0 |
| 1 | 1 | 0 | 0 |
| 1 | 1 | 0 | 0 |
| 1 | 1 | 0 | 0 |

174 71

FIG. 3C

| 01000111 | 10101110 | 1100110011001100 |
|---|---|---|
| REPRESENTATIVE VALUE a2 | REPRESENTATIVE VALUE b2 | ARRANGEMENT PATTERN m2 |

FIG. 3D

| | | | |
|---|---|---|---|
| 174 | 174 | 71 | 71 |
| 174 | 174 | 71 | 71 |
| 174 | 174 | 71 | 71 |
| 174 | 174 | 71 | 71 |

FIG. 6A

| | | | |
|---|---|---|---|
| 200 | 149 | 90 | 50 |
| 200 | 146 | 92 | 50 |
| 200 | 152 | 90 | 50 |
| 200 | 144 | 99 | 50 |

AVERAGE 123 (HIGH AVERAGE 174, LOW AVERAGE 71)

FIG. 6B

| | | | |
|---|---|---|---|
| 10 | 01 | 01 | 00 |
| 10 | 01 | 01 | 00 |
| 10 | 01 | 01 | 00 |
| 10 | 01 | 01 | 00 |

200 120 50

FIG. 6C

NUMBER OF SEGMENTS (0: 2 SEGMENTS, 1: 3 SEGMENTS)

| | | | | |
|---|---|---|---|---|
| 1 | 00110(010) | 01111(000) | 11001(000) | 10010100100101001001010010010100 |
| | REPRESENTATIVE VALUE a3 | REPRESENTATIVE VALUE b3 | REPRESENTATIVE VALUE c3 | ARRANGEMENT PATTERN m3: 2*16 |

FIG. 6D

| | | | |
|---|---|---|---|
| 200 | 120 | 120 | 48 |
| 200 | 120 | 120 | 48 |
| 200 | 120 | 120 | 48 |
| 200 | 120 | 120 | 48 |

FIG. 7A

| | | | |
|---|---|---|---|
| 200 | 149 | 90 | 50 |
| 200 | 146 | 92 | 50 |
| 200 | 152 | 90 | 50 |
| 200 | 144 | 99 | 50 |

FIG. 7B

| | |
|---|---|
| 174 | 71 |
| 174 | 72 |

AVERAGE 123 (HIGH AVERAGE 174, LOW AVERAGE 71)

FIG. 7C

| | |
|---|---|
| 10 | 00 |
| 10 | 01 |

168 72 64

FIG. 7D

NUMBER OF SEGMENTS (0: 2 SEGMENTS, 1: 3 SEGMENTS)

| | | | | |
|---|---|---|---|---|
| 1 | 00110(010) | 01010(000) | 10101(110) | 10001001 |
| | REPRESENTATIVE VALUE a3 | REPRESENTATIVE VALUE b3 | REPRESENTATIVE VALUE c3 | ARRANGEMENT PATTERN m3: 2*4 |

FIG. 7E

| | | | |
|---|---|---|---|
| 168 | 168 | 64 | 64 |
| 168 | 168 | 64 | 64 |
| 168 | 168 | 72 | 72 |
| 168 | 168 | 72 | 72 |

FIG. 12A

| | | | |
|---|---|---|---|
| 200 | 149 | 90 | 50 |
| 200 | 146 | 92 | 50 |
| 200 | 152 | 90 | 50 |
| 200 | 144 | 99 | 50 |

AVERAGE 123

FIG. 12B

| | | | |
|---|---|---|---|
| 200 | 200 | 149 | 90 |
| 200 | 200 | 146 | 92 |
| 200 | 200 | 152 | 90 |
| 200 | 200 | 144 | 99 |

AVERAGE 160

FIG. 12C

| | | | |
|---|---|---|---|
| 174 | 174 | 71 | 71 |
| 174 | 174 | 71 | 71 |
| 174 | 174 | 71 | 71 |
| 174 | 174 | 71 | 71 |

FIG. 12D

| | | | |
|---|---|---|---|
| 200 | 200 | 120 | 120 |
| 200 | 200 | 120 | 120 |
| 200 | 200 | 120 | 120 |
| 200 | 200 | 120 | 120 |

FIG. 17A

| | | | |
|---|---|---|---|
| 200 | 149 | 90 | 50 |
| 200 | 146 | 92 | 50 |
| 200 | 152 | 90 | 50 |
| 200 | 144 | 99 | 50 |

FIRST AVERAGE 123
SECOND AVERAGES 174
AND 71
4-LEVEL AAE-1

FIG. 17B

| | | | |
|---|---|---|---|
| 200 | 200 | 149 | 90 |
| 200 | 200 | 146 | 92 |
| 200 | 200 | 152 | 90 |
| 200 | 200 | 144 | 99 |

AVERAGE 160
SECOND AVERAGES 199
AND 120
4-LEVEL AAE-1

FIG.17C

| | | | |
|---|---|---|---|
| 200 | 143 | 86 | 48 |
| 200 | 143 | 86 | 48 |
| 200 | 143 | 86 | 48 |
| 200 | 143 | 86 | 48 |

FIG. 17D

| | | | |
|---|---|---|---|
| 197 | 200 | 146 | 92 |
| 197 | 200 | 146 | 92 |
| 197 | 200 | 146 | 92 |
| 197 | 200 | 146 | 92 |

FIG. 20
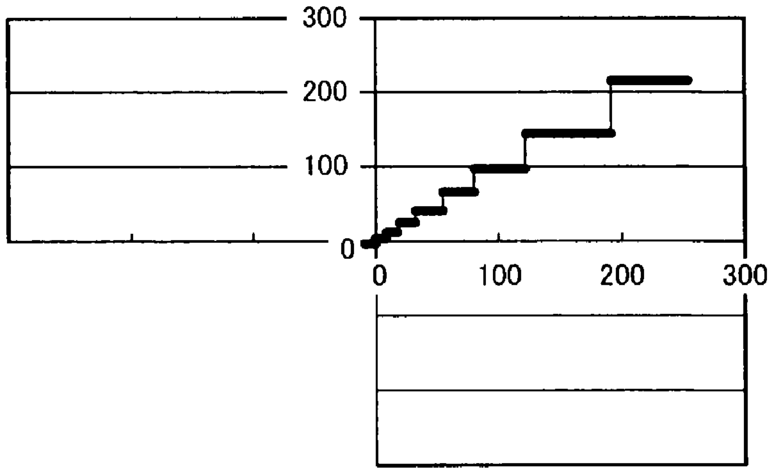
FIG. 21
(A)
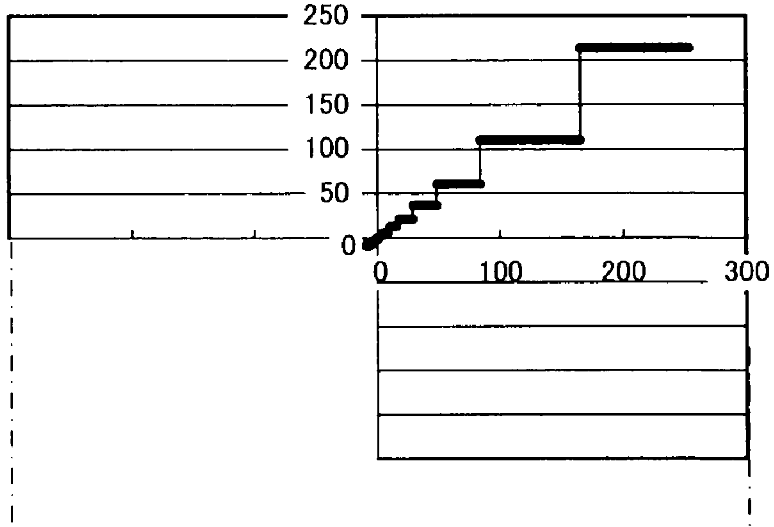
(B)
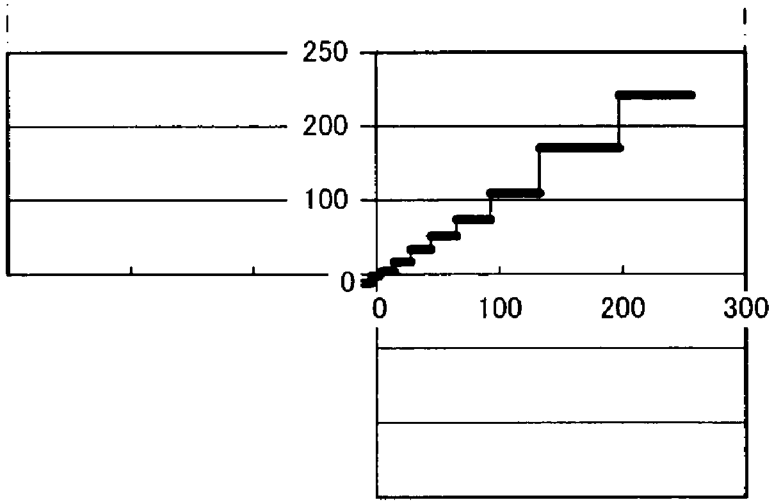

FIG. 25A

Y INPUT IMAGE

| | | | |
|---|---|---|---|
| 200 | 149 | 90 | 50 |
| 200 | 146 | 92 | 50 |
| 200 | 152 | 90 | 50 |
| 200 | 144 | 99 | 50 |

AVERAGE 123

FIG. 25B

| | | | |
|---|---|---|---|
| 1 | 1 | 0 | 0 |
| 1 | 1 | 0 | 0 |
| 1 | 1 | 0 | 0 |
| 1 | 1 | 0 | 0 |

174 71

FIG. 25C

TRANSMISSION PREPARATION DATA

| REPRESENTATIVE VALUE a2 | REPRESENTATIVE VALUE b2 | ARRANGEMENT PATTERN m2 |
|---|---|---|
| 01000111 | 10101110 | 1100110011001100 |

FIG. 25D

SELECT REPRESENTATIVE PATTERN (PATTERN IDENTIFIER (1001)) HAVING LARGEST CORRELATION WITH ARRANGEMENT PATTERN m2

FIG. 25E

TRANSMITTED DATA

| REPRESENTATIVE VALUE a2 | REPRESENTATIVE VALUE b2 | PATTERN IDENTIFIER |
|---|---|---|
| 00110010 | 01111000 | 1001 |

FIG. 25F

REPRODUCED IMAGE

| | | | |
|---|---|---|---|
| 174 | 174 | 71 | 71 |
| 174 | 174 | 71 | 71 |
| 174 | 174 | 71 | 71 |
| 174 | 174 | 71 | 71 |

FIG. 28

| NUMBER OF SEGMENTS | RGB AVERAGE S/N RATIO [dB] | | |
|---|---|---|---|
| | C SUB-SAMPLE ABSENT | C SUB-SAMPLE PRESENT | CONDITION |
| 2 SEGMENTS | 27 | 25 | 8 BITS * 2 |
| 3 SEGMENTS | 32 | 30 | 8 BIT * 3 |
| 4 SEGMENTS | 40 | 34 | 8 BIT * 4 |

| IDENTIFIER | REPRESENTATIVE PATTERN | IDENTIFIER | REPRESENTATIVE PATTERN |
|---|---|---|---|
| 0000 | 0000000000000000 | 1000 | 1110111011101110 |
| 0001 | 0000111111111111 | 1001 | 1100110011001100 |
| 0010 | 1111111100000000 | 1010 | 1111000011111111 |
| 0011 | 1111111100001111 | 1011 | 0011001100110011 |
| 0100 | 0000000011111111 | 1100 | 1111000000000000 |
| 0101 | 1111111111110000 | 1101 | 1101110111011101 |
| 0110 | 0111011101110111 | 1110 | 0000111100001111 |
| 0111 | 0000000000001111 | 1111 | 1011101110111011 |

IMAGE DATA PROCESSING SYSTEM AND IMAGE DATA PROCESSING METHOD FOR GENERATING ARRANGEMENT PATTERN REPRESENTING ARRANGEMENT OF REPRESENTATIVE VALUE IN PIXEL BLOCK INCLUDING PIXEL IN IMAGE

CROSS-REFERENCE TO RELATED APPLICATIONS

This application is based upon and claims the benefit of priority from the prior Japanese Patent Application No. 2007-246598, filed on Sep. 25, 2007; the entire contents of which are incorporated herein by reference.

BACKGROUND OF THE INVENTION

1. Field of the Invention

The present invention relates to an image data processing system and an image data processing method.

2. Description of the Related Art

Along with enlargement of screens and increase of resolutions of display devices in recent years, a need for reducing EMI (electromagnetic interference) emitted from an electronic apparatus having a display device is increasing. Technologies to reduce EMI emitted from an electronic apparatus having such a display device have been proposed. For example, by transmitting/receiving difference data of image data being delayed for a predetermined period and current image data, a data amount to be transmitted/received is reduced and the EMI is reduced (refer to, for example, JP-A 2000-20031(KOKAI)).

BRIEF SUMMARY OF THE INVENTION

However, the reduction of transmitted/received data amount by conventional arts cannot be considered sufficient. An object of the present invention is to provide an image data processing system and an image data processing method which are capable of reducing effectively a transmitted/received data amount.

An image data processing system according to one aspect of the present invention includes an extracting unit extracting from an image signal corresponding to one image a signal corresponding to a pixel block including plural pixels in the image, a threshold calculating unit calculating a threshold for classifying the plural pixels into plural segments by linear calculation of display values of the plural pixels, a representative value calculating unit calculating plural representative values corresponding to the plural segments based on the threshold, a generating unit generating an arrangement pattern representing an arrangement of the representative values in the pixel block, and a transmitting unit transmitting the representative values and the arrangement pattern.

An image data processing method according to one aspect of the present invention includes extracting from an image signal corresponding to one image a signal corresponding to a pixel block including plural pixels in the image, calculating a threshold for classifying the plural pixels into plural segments by linear calculation of display values of the plural pixels, calculating plural representative values corresponding to the plural segments based on the threshold, generating an arrangement pattern representing an arrangement of the representative values in the pixel block, and transmitting the representative values and the arrangement pattern.

BRIEF DESCRIPTION OF THE DRAWINGS

FIGS. 3A-3D are schematic diagrams representing an example of image data processed by the image display device.

FIGS. 6A-6D are schematic diagrams representing an example of image data processed by the image display device.

FIGS. 7A-7E are schematic diagrams representing an example of image data processed by the image display device.

FIGS. 12A-12D are schematic diagrams representing states of data processing with a moving image.

FIGS. 17A-17D are schematic diagrams representing states of data processing with a moving image.

FIG. 20 is a schematic diagram showing an example of a quantization table.

FIG. 21 is a schematic diagram representing an example of a combination of quantization tables.

FIGS. 25A-25F are schematic diagrams representing an example of image data processed by the image display device.

FIG. 28 is a diagram representing an example of a correspondence of the number of representative values with image quality.

DESCRIPTION OF THE EMBODIMENTS

In embodiments of the present invention, an image is divided into pixel blocks, and display values of pixels in the pixel blocks are represented by plural values, to thereby reduce a transmitted data amount. Note that the display value refer to at least one of information held by a pixel such as luminance, chrominance, and the like.

Hereinafter, embodiments of the present invention will be explained in detail with reference to the drawings.

First Embodiment

Figure 1:
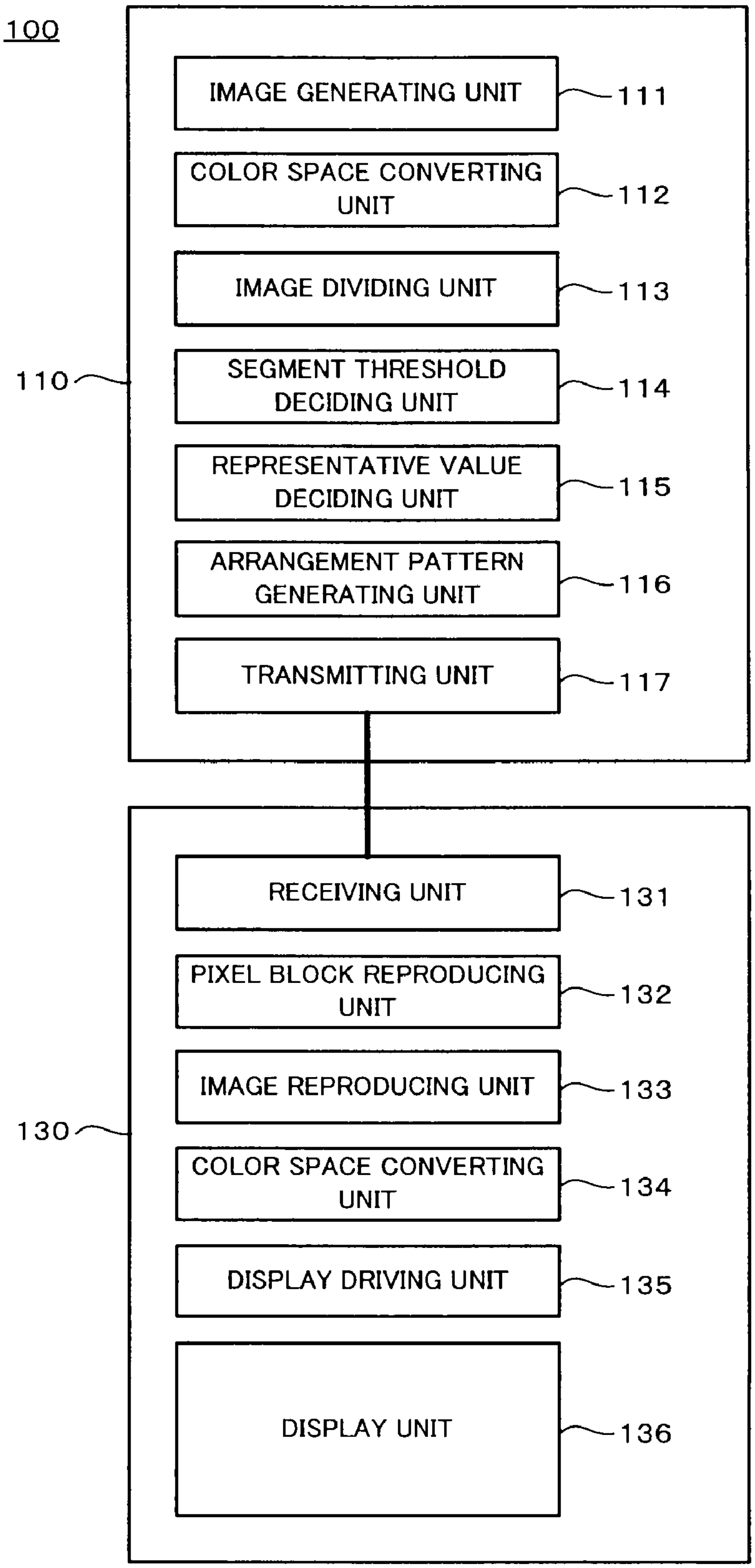
FIG. 1 is a block diagram representing an image display device according to a first embodiment.

FIG. 1 is a block diagram representing an image display device 100 according to a first embodiment of the present invention. The image display device 100, which displays an image, has an image data transmitting unit 110, and an image data receiving unit 130.

The image data transmitting unit 110, which transmits image data, has an image generating unit 111, a color space converting unit 112, an image dividing unit 113, a segment threshold deciding unit 114, a representative value deciding unit 115, an arrangement pattern generating unit 116, and a transmitting unit 117.

The image data receiving unit 130, which receives and displays image data, has a receiving unit 131, a pixel block reproducing unit 132, an image reproducing unit 133, a color space converting unit 134, a display driving unit 135, and a display unit 136.

The image generating unit 111 generates an image signal representing an image and generates and outputs, for example, an image signal for displaying an image from image data stored in a storage device (for example, a hard disk, a semiconductor memory). This image may be either a still image or a moving image.

The color space converting unit 112 converts the color space of an image signal outputted from the image generating unit 111. Specifically, the converting unit converts an image signal of RGB color space into an image signal of YCbCr color space. In the YCbCr color space, Y, Cb, Cr represent luminance (brightness), difference in blue, difference in red, respectively.

The image dividing unit 113 divides an image with the color space converted in the color space converting unit 112 into plural blocks (pixel blocks). Plural pixels (pixels of N*M (N rows, M columns)) are included in each of the pixel blocks. Here, N*M is 4*4. Note that YCbCr corresponds to each of the pixels (having information (display values) of luminance and color). The image dividing unit 113 functions as an extracting unit extracting, from an image signal corresponding to one image, a signal corresponding to a pixel block formed by plural pixels in this image.

The segment threshold deciding unit 114 decides a threshold for classifying pixels in a pixel block into plural segments. The segment threshold deciding unit 114 functions as a threshold calculating unit calculating the threshold for classifying plural pixels into plural segments.

The representative value deciding unit 115 decides a representative value in each of the plural segments of the pixel block. The representative value deciding unit 115 functions as a representative value calculating unit calculating plural representative values corresponding to the plural segments respectively. The arrangement pattern generating unit 116 functions as a generating unit generating an arrangement pattern representing an arrangement of the representative values in the pixel block. The transmitting unit 117 transmits the representative values and the arrangement pattern.

The receiving unit 131 receives the representative values and the arrangement pattern from the transmitting unit 117. The pixel block reproducing unit 132 reproduces a pixel block from the representative values and the arrangement pattern received by the receiving unit 131. The image reproducing unit 133 reproduces an image from plural pixel blocks.

The color space converting unit 134 converts the color space of an image signal outputted from the image reproducing unit 133 from the YCbCr color space into the RGB color space. The display driving unit 135 is a driving circuit (driver) driving the display device 136. The display unit 136 is a display element displaying an image, for example, a liquid crystal display element.

Here, it is preferable that the pixel block reproducing unit 132, the image reproducing unit 133, and the color space converting unit 134 are structured integrally with the display driving unit 135. By the integral structure, processing becomes more efficient, and lower power consumption is realized. The same applies to other embodiments (second to eighth embodiments).

(Operations of the Image Display Device 100)

Figure 2:
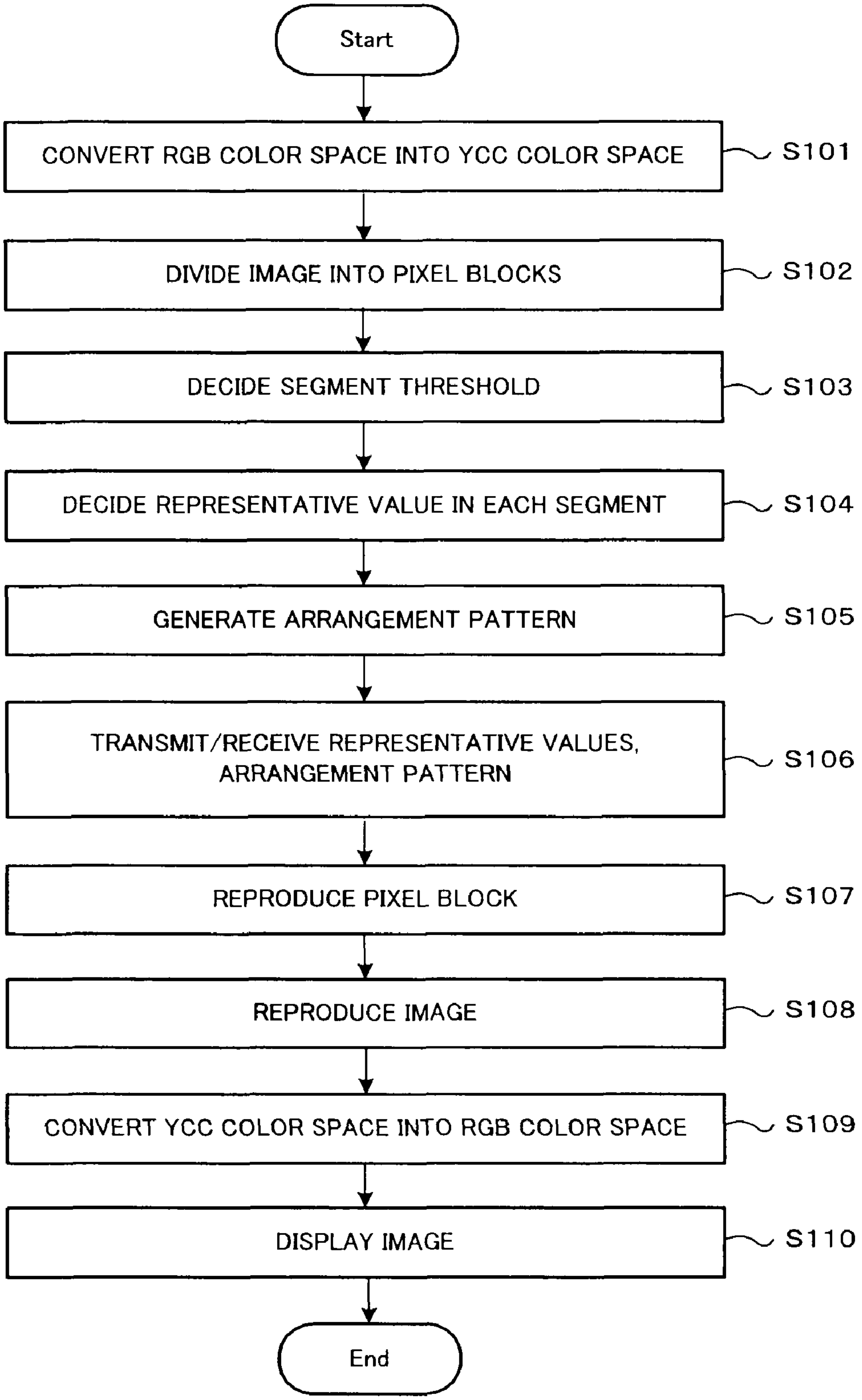
FIG. 2 is a flowchart representing an example of an operation procedure of the image display device.

Operations of the image display device 100 will be explained. FIG. 2 is a flowchart representing an example of an operation procedure of the image display device 100. FIG. 3A to FIG. 3D are schematic diagrams representing an example of image data processed in the image display device 100.

(1) Converting the Color Space (Step S101)

The color space converting unit 112 converts the color space of an image signal outputted from the image generating unit 111 from RGB color space into YCbCr color space. This conversion is for handling luminance and color of each pixel.

(2) Dividing an Image into Blocks (Pixel Blocks) (Step S102)

The image dividing unit 113 divides the image with the color space converted in the color space converting unit 112 into plural blocks (pixel blocks). An example of the pixel blocks is shown in FIG. 3A. Luminances of 4*4 pixels respectively are represented for one pixel block.

(3) Deciding the Segment Threshold (Step S103)

The segment threshold deciding unit 114 decides the threshold for classifying the pixels in the pixel block into plural segments. Here, it is considered that the pixels in the pixel block are classified into two segments. By linear calculation (for example, calculation of average values) of the luminances of the pixels in the pixel block, a threshold Th can be decided. Specifically, with reference to the threshold Th (for example, average value Av), the pixels (luminances) in the pixel block can be classified into two segments. In the case of FIG. 3A, the threshold Th (average value Av) is calculated as follows.

$$\begin{aligned} Th &= Av \\ &= (200+149+90+50+\ldots+99+50)/16 \\ &= 123 \end{aligned}$$

(4) Deciding the Representative Value in each Segment (Step S104)

The representative value deciding unit 115 decides the representative value in each of the plural segments of the pixel block. An average Av1 of luminances in a pixel group G1 with luminances smaller than the threshold Th is calculated, and is taken as a representative value Vr1 in the pixel group G1. An average Av2 of luminances in a pixel group G2 with luminances larger than the threshold Th is calculated, and is taken as a representative value Vr2 in the pixel group G2. In this example, the representative values Vr1, Vr2 become 71, 174 respectively. Note that in the above-described processing, an influence of any unique pixel can be reduced by excluding the smallest value and the largest value of luminances of the pixels in the pixel block.

(5) Generating the Arrangement Pattern (step S105)

The arrangement pattern generating unit 116 generates the arrangement pattern representing an arrangement (about which pixel is smaller/larger than the threshold Th) of the representative values in the pixel block. This generation is performed almost simultaneously with deciding of the representative values. The arrangement pattern corresponding to the pixel block of FIG. 3A is represented in FIG. 3B. Since the segments are two, whether or not to correspond to the two representative values Vr1, Vr2 respectively is represented by one bit (0, 1) on a map.

(6) Transmitting/Receiving the Representative Values and the Arrangement Pattern (step S106)

The transmitting unit 117 transmits the representative values and the arrangement pattern, which are received by the receiving unit 131. In FIG. 3C, the representative values and the arrangement pattern transmitted/received corresponding to the pixel block of FIG. 3A are represented. In this manner, information of one pixel block can be transmitted by a total of 32 bits of two eight-bit representative values Vr1, Vr2 and arrangement pattern information of one bit*16 pixels. In comparison, when the pixels of the pixel block are each transmitted by 8 bits, it results in 8*16=128 bits in total. That is, by transmitting/receiving the representative values and the arrangement pattern, the transmitted/received data amount can be reduced to ¼ (compression of information) as compared to the case of transmitting/receiving the pixels as they are.

(7) Reproducing a Pixel Block (Step S107)

The pixel block reproducing unit 132 reproduces a pixel block from the representative values and the arrangement pattern received by the receiving unit 131. FIG. 3D represents a pixel block reproduced corresponding to the original pixel block of FIG. 3A.

(8) Reproducing an Image (Step S108)

The image reproducing unit 133 reproduces an image from plural pixel blocks.

(9) Converting the Color Space (Step S109)

The color space converting unit 134 converts the color space of an image signal outputted from the image reproducing unit 133 from YCbCr color space into RGB color space.

(10) Displaying the Image (step S110)

The display driving unit 135 drives the display unit 136 to display the image.

As can be seen by comparing FIG. 3A, FIG. 3C, at the pixel block level, the original image is binarized and tends to be simple in the reproduced image (compression of information). However, in the entire image, the influence of compression of information is small, and the difference of the reproduced image from the original image is not recognized in reality by a viewer. This is due to the fact that approximating data tend to be in the vicinity on an image. Specifically, on an image, brightness and darkness are not arranged randomly but tend to be arranged as a group to a certain extent. Randomly arranged brightness and darkness are noise components of an image in many cases, and hence the influence of losing data of such components on visibility is small.

Processing of luminance Y has been explained above. For chrominances Cb, Cr, data can be compressed and transmitted/received by similar processing.

In this embodiment, the number of segments (number of representatives) for classifying pixels are two. In this case, when there is a small change such as an edge in the image, the edge may be blurred or a false edge may occur. When an image was actually processed, image quality of generally tolerable level was obtained even with the number of segments being two. Particularly, good image quality was obtained with a natural image in which an edge of an image does not occur so much and which is a still image.

Second Embodiment

Figure 4:
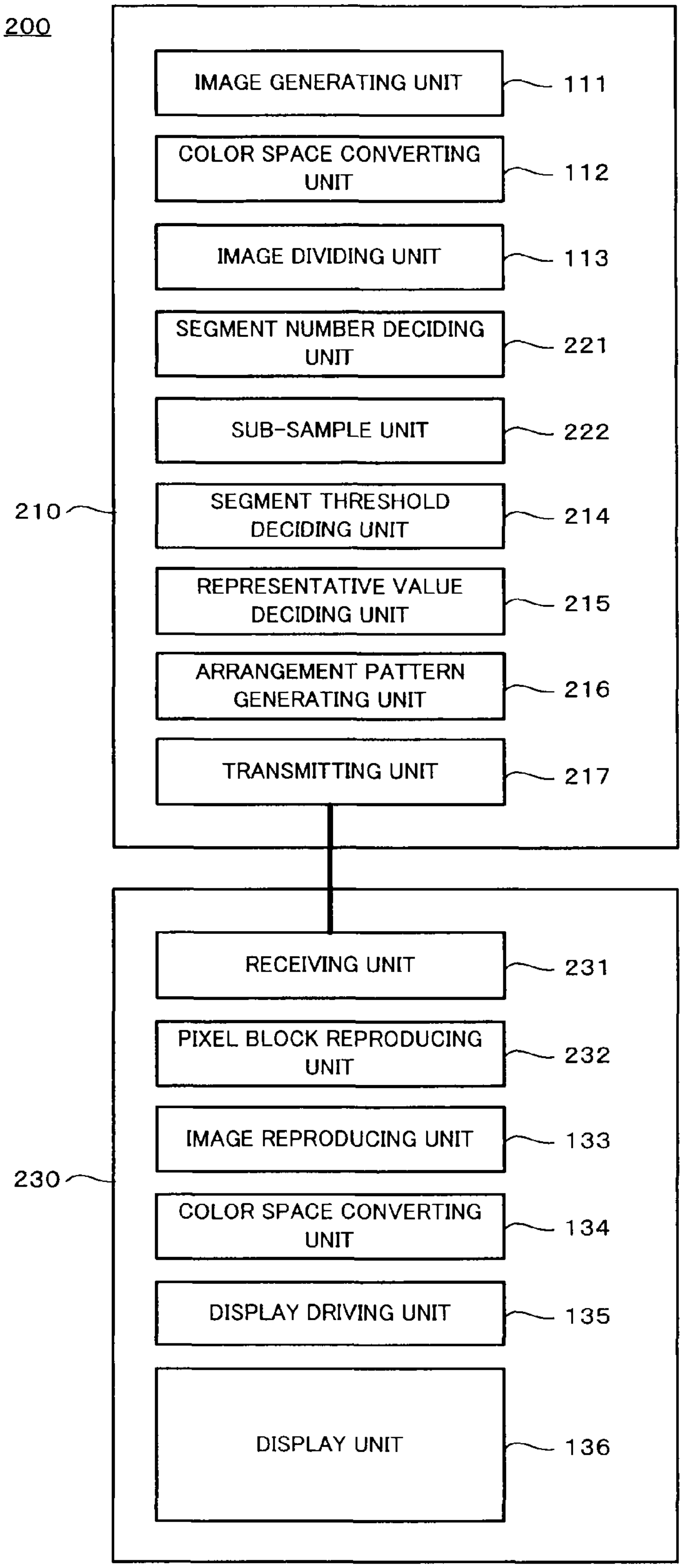
FIG. 4 is a block diagram representing an image display device according to a second embodiment.

FIG. 4 is a block diagram representing an image display device 200 according to a second embodiment of the present invention. The image display device 200, which displays an image, has an image data transmitting unit 210 and an image data receiving unit 230. In this embodiment, the number of segments for classifying pixels is switched based on a characteristic amount of an image.

The image data transmitting unit 210, which transmits image data, has an image generating unit 111, a color space converting unit 112, an image dividing unit 113, a segment number deciding unit 221, a sub-sample unit 222, a segment threshold deciding unit 214, a representative value deciding unit 215, an arrangement pattern generating unit 216, and a transmitting unit 217.

The image data receiving unit 230, which receives and displays image data, has a receiving unit 231, a pixel block reproducing unit 232, an image reproducing unit 133, a color space converting unit 134, a display driving unit 135, and a display unit 136.

The segment number deciding unit 221 decides the number of segments (number of representatives) for classifying pixels based on a spatial variation of luminances of pixels in a pixel block. Here, an intra-field difference sum is used as the spatial variation of luminances of pixels. Note that details thereof will be explained later.

The sub-sample unit 222 sub-sample processes chrominances Cb, Cr. The sub-sample process means adding the same value to plural pixels, and details thereof will be described later.

The segment threshold deciding unit 214 decides a threshold for classifying pixels in a pixel block into plural segments corresponding to the number of segments. The representative value deciding unit 215 decides a representative value in each of the plural segments of the pixel block corresponding to the number of segments. The arrangement pattern generating unit 216 generates an arrangement pattern representing an arrangement of the representative values in the pixel block corresponding to the number of segments.

The transmitting unit 217 transmits the number of segments, the representative values, and the arrangement pattern. The receiving unit 231 receives the number of segments, the representative values, and the arrangement pattern from the transmitting unit 217.

The pixel block reproducing unit 232 reproduces a pixel block from the number of segments, the representative values, and the arrangement pattern received by the receiving unit 231. The image generating unit 111, the color space converting unit 112, the image dividing unit 113, the image reproducing unit 133, the color space converting unit 134, the display driving unit 135, and the display unit 136 are not practically different from those in the first embodiment, and hence detailed explanation thereof is omitted.

(Operations of the Image Display Device 200)

Figure 5:
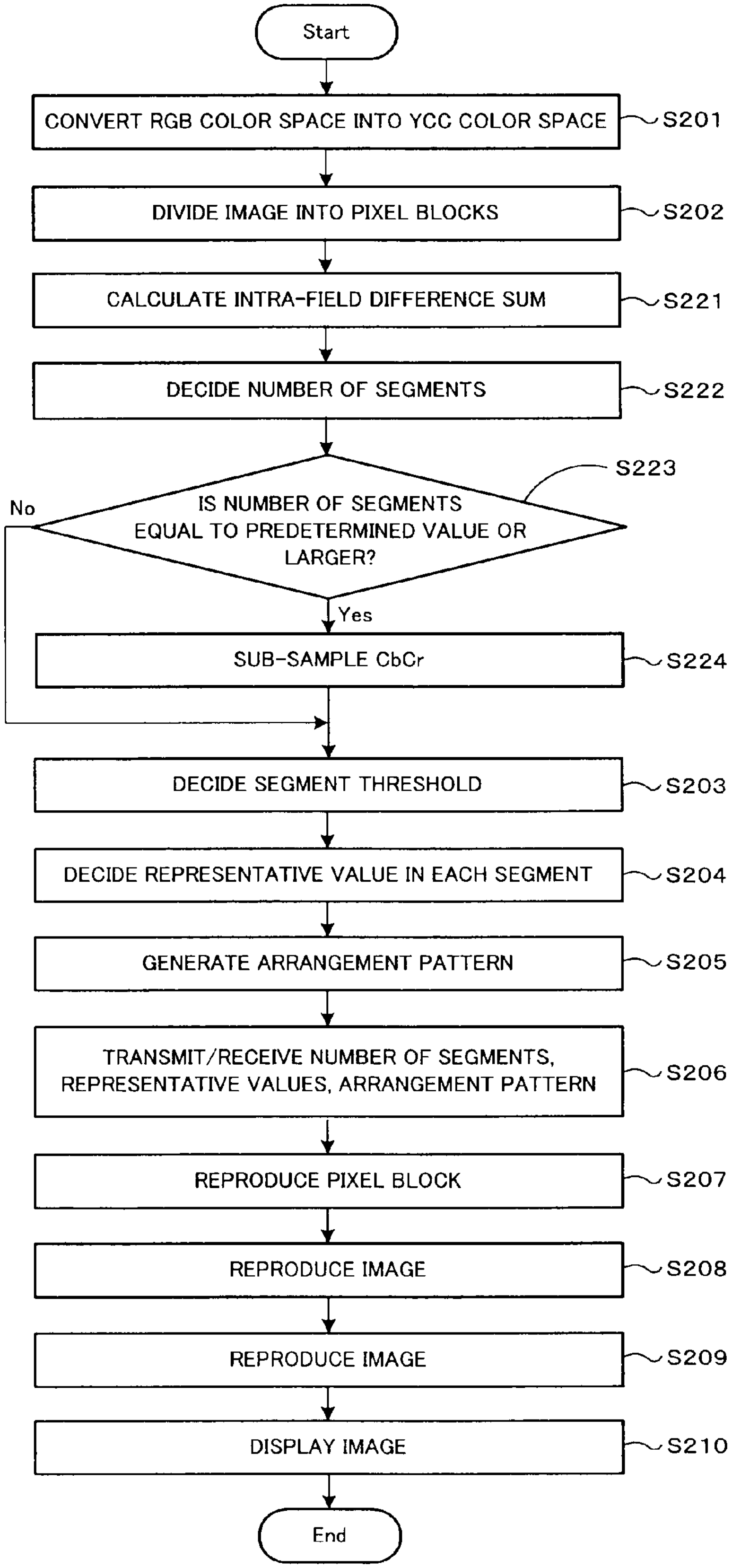
FIG. 5 is a flowchart representing an example of an operation procedure of the image display device.

Operations of the image display device 200 will be explained. FIG. 5 is a flowchart representing an example of an operation procedure of the image display device 200. FIG. 6A to FIG. 6D, FIG. 7A to FIG. 7D are schematic diagrams representing examples of image data processed in the image display device 200. FIG. 6A to FIG. 6D correspond to luminance (Y), and FIG. 7A to FIG. 7D correspond to chrominances (Cr, Cb).

(1) Converting the Color Space, Dividing an Image into Blocks (Steps S201, S202)

The color space converting unit 112 converts the color space of an image signal outputted from the image generating unit 111 from RGB color space into YCbCr color space. Further, the image dividing unit 113 divides the image with the color space converted in the color space converting unit 112 into plural blocks (pixel blocks). An example of the pixel blocks is shown in FIG. 6A, FIG. 7A. Luminances and chrominances of 4*4 pixels respectively are represented for one pixel block. Here, the values of the luminances and the chrominances are the same.

(2) Calculating the Intra-Field Difference Sum and Deciding the Number of Segments (Steps S221, S222)

The segment number deciding unit 221 calculates the intra-field difference sum and decides the number of segments for classifying pixels as two or three.

Figure 8:
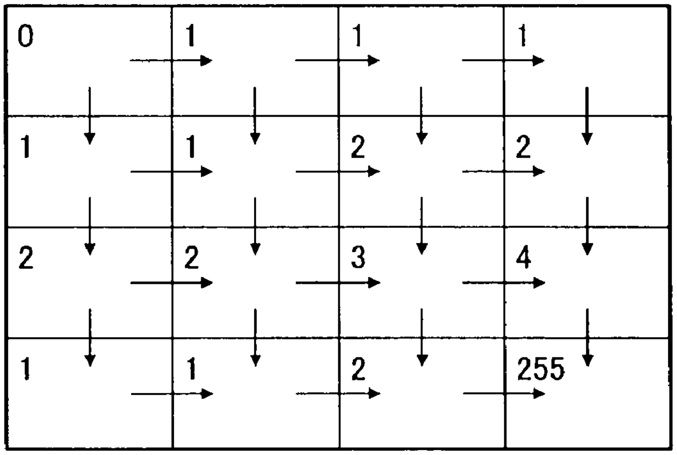
FIG. 8 is a schematic diagram representing the concept of an intra-field difference sum.

FIG. 8 is a schematic diagram representing the concept of the intra-field difference sum Sp. The intra-field difference sum Sp means a total sum of differences of luminances between adjacent pixels in a pixel block. The intra-field difference sum is a kind of characteristic amount of an image, and can be used as a parameter for representing an occurrence amount (activity amount) of an edge in an image.

In the example of FIG. 6A, the intra-field difference sum Sp is calculated as follows.

$$
\begin{aligned}
Sp &= (|200-149|+|149-90|+|90-50|+|200-146|+\ldots+\\
&\quad |200-200|+|200-200|+|200-200|+|149-146|+\\
&\quad |152-146|+|152-144|+\ldots)/24\\
&= (600+30)/24\\
&= 26
\end{aligned}
$$

Figure 9:
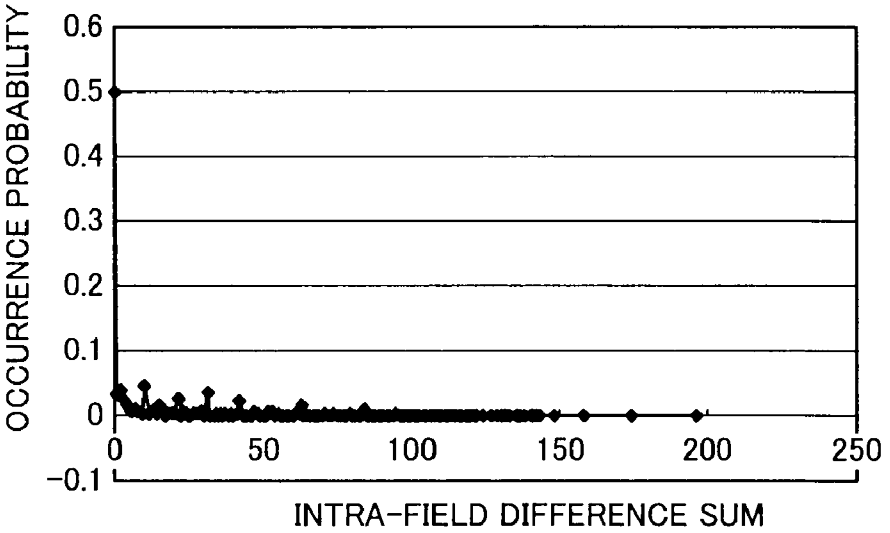
FIG. 9 is a graph representing a correspondence of values of the intra-field difference sum with occurrence probability.

FIG. 9 is a graph representing a correspondence of values of the intra-field difference sum Sp with occurrence probability. It can be seen that, in most cases, the intra-field difference sum Sp is 10 or smaller. This indicates that a value larger than about 10 may be used as a boundary (threshold) for deciding which of two values (two or three) the number of segments should be set to. Specifically, it becomes possible to process the number of segments as two in most cases, and hence efficient compression of data becomes possible.

Here, with the threshold of the intra-field difference sum Sp being set to 20, the number of segments is set to three when the intra-field difference sum Sp is 20 or larger, or otherwise the number of segments is set to two. When the threshold is increased, the compression ratio of data increases, but the S/N ratio of an image decreases. On the other hand, when the threshold is decreased, the S/N ratio of an image improves, but the compression ratio of data decreases. Thus, to set the value of the threshold, influences on both the compression ratio of data and S/N ratio of an image should be considered. As a result of experiment, by setting the threshold to 30, the S/N ratio of an image became 30 dB or larger, and occurrence of a false edge was reduced.

(3) Sub-Sampling of the Chrominances (Step S223, S224)

When the number of representatives is equal to a predetermined value (here, three) or larger, the chrominances Cr, Cb are sub-sampled.

FIG. 7B represents a sub-sampled pixel block. One value (chrominance) is assigned to four pixels of 2*2 (¼ sub-sample). In this example, the average value of chrominances Cr, Cb in the four pixels is taken as a common value for the four pixels. By sub-sampling the chrominances Cr, Cb, further compression of data becomes possible. Note that it is also possible to sub-sample using chrominances in a predetermined pixel (for example, the top left pixel) in the four pixels.

From an experimental evaluation, it was found that by switching the number of segments between two and three, occurrence of coloring or blurring of an edge can be prevented when chrominances are sub-sampled. For example, when the number of segments is fixed to two and the chrominances are sub-sampled, it is possible that coloring or blurring of an edge occurs.

(4) Deciding the Segment Threshold (Step S203)

The segment threshold deciding unit 214 decides the threshold for classifying the pixels in the pixel block into plural segments by linear calculation according to the number of segments.

1) When the Number of Segments is Two

Similarly to the first embodiment, a threshold Th can be decided by linear calculation (for example, calculation of an average value) of luminances of the pixels in the pixel block. By the threshold Th, the pixels in the pixel block can be divided in two (segments A1, A2).

2) When the Number of Segments is Three

Figure 10:
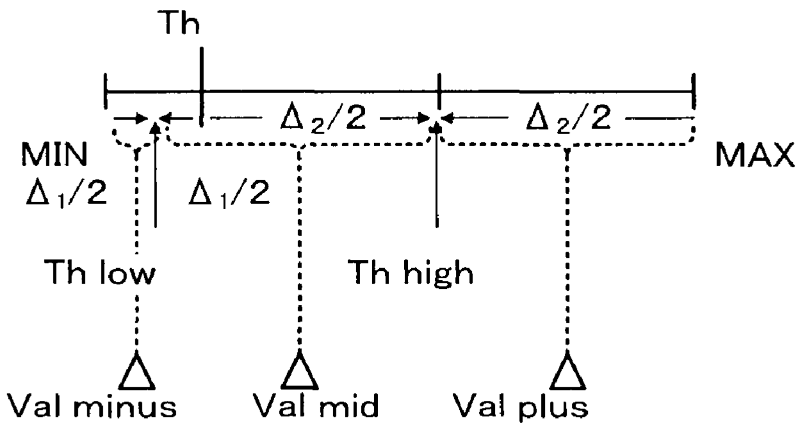
FIG. 10 is a diagram showing an example of a method of calculating thresholds and representative values.

A method of calculating thresholds $Th_{low}$, $Th_{high}$ and representative values when the number of segments is three is shown in FIG. 10. With the average value of luminances or the like of the pixels in the pixel block being taken as the threshold Th, the pixels in the pixel block are divided in two (segments A1, A2). The average values of luminances or the like of the pixels in the segments A1, A2 respectively are taken as the thresholds $Th_{low}$, $Th_{high}$. The pixels in the pixel block can be divided into three (segments B1 to B3) by these thresholds $Th_{low}$, $Th_{high}$.

Note that when calculating the threshold Th, an influence of any unique pixel can be reduced by excluding the smallest value and the largest value of luminances of the pixels in the pixel block.

(5) Deciding the Representative Value in each Segment (Step S204)

The representative value deciding unit 215 decides the representative value in each of the plural segments of the pixel block according to the number of segments.

1) When the Number of Segments is Two

The averages of luminances of the segments A1, A2 are taken as representative values, respectively.

2) When the Number of Segments is Three

The averages of luminances of the segments B1 to B3 are taken as representative values $Val_{minus}$, $Val_{mid}$, $Val_{plus}$, respectively (refer to FIG. 10).

Note that for both the numbers of segments, two and three, any kind of statistic (for example, mode) other than the average values can be adopted.

(6) Generating the Arrangement Pattern (Step S205)

The arrangement pattern generating unit 216 generates the arrangement pattern representing an arrangement of the representative values in the pixel block according to the number of segments. This generation is done almost at the same time as (in parallel to) deciding of the representative values.

The arrangement patterns generated corresponding to the pixel blocks of FIG. 6A, FIG. 7A are shown in FIG. 6B, FIG. 7C. Since there are three segments, whether corresponding to each of the three representative values or not is represented by two bits (00, 01, 10) on a map.

(7) Transmitting/Receiving the Number of Segments, the Representative Values, and the Arrangement Pattern (Step S206)

The transmitting unit 217 transmits the number of segments, the representative values, and the arrangement pattern, which are received by the receiving unit 231. The number of segments, the representative values, and the arrangement patterns transmitted/received corresponding to the pixel blocks of FIG. 6A, FIG. 7A are represented in FIG. 6C, FIG. 7D. The numbers of segments 2, 3 are represented by one bit (0, 1), the three representative values are represented by five bits, and the arrangement patterns are represented by 2*16 bits or 2*4 bits. Here, the representative values are changed from 8-bit display to 5-bit display, thereby reducing the data amount.

(8) Reproducing a Pixel Block (Step S207)

The pixel block reproducing unit 232 reproduces a pixel block from the number of segments, the representative values, and the arrangement pattern received by the receiving unit 231. FIG. 6D, FIG. 7E represent pixel blocks reproduced corresponding to the original pixel blocks of FIG. 6A, FIG. 7A. Since the numbers of bits of the representative values are reduced, the representative values in FIG. 6D, FIG. 7E do not completely match with the representative values decided in step S204. Specifically, one corresponding to the value (representative value) 48 in FIG. 6D is the representative value 50, and there is a difference. However, on the entire image, the influence of such cutting off of bits is small.

(9) Reproducing an Image, Converting the Color Space, and Displaying the Image (Steps S208 to S210)

There is no difference from the first embodiment in reproducing an image, converting the color space, and displaying the image, and hence explanation thereof is omitted.

Third Embodiment

Figure 11:
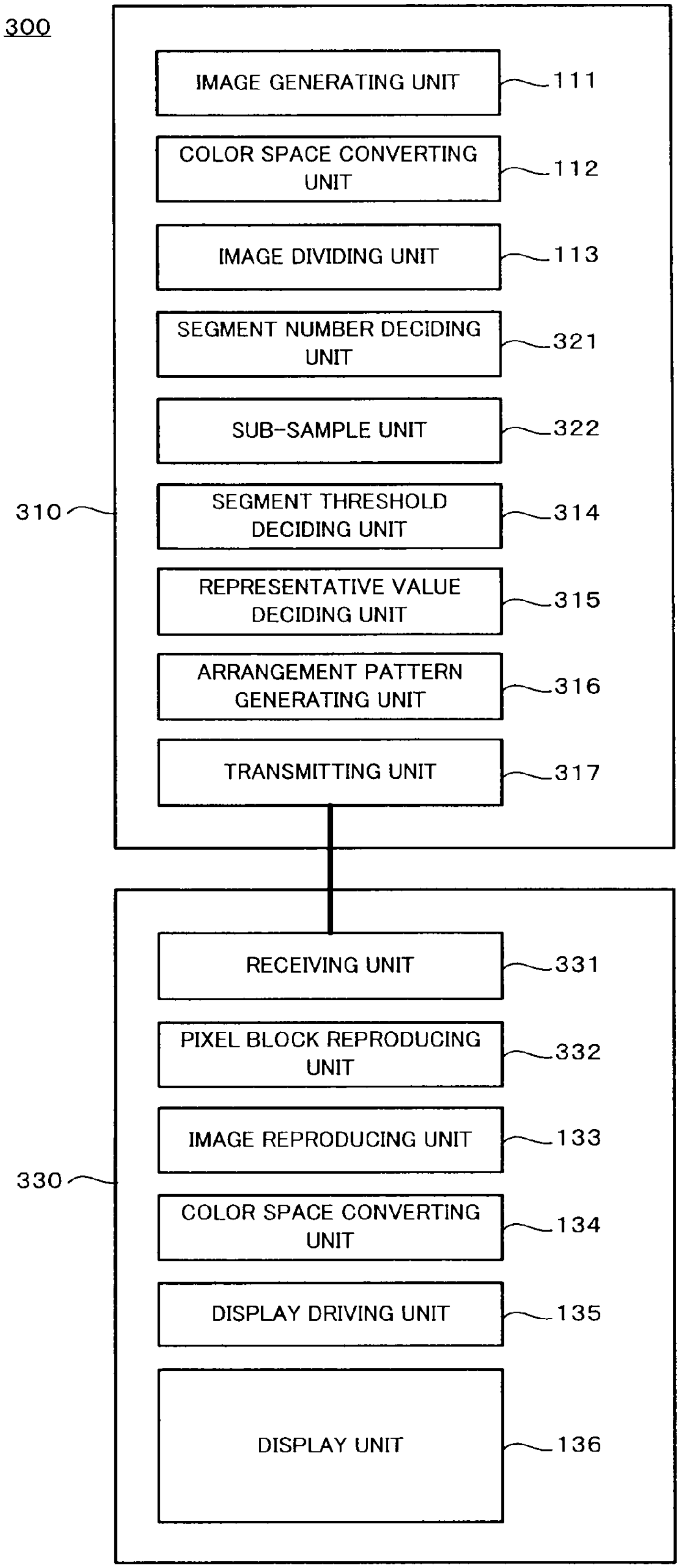
FIG. 11 is a block diagram representing an image display device according to a third embodiment.

FIG. 11 is a block diagram representing an image display device 300 according to a third embodiment of the present invention. The image display device 300, which displays an image, has an image data transmitting unit 310, and an image data receiving unit 330. In this embodiment, the number of segments for classifying pixels is switched among two to four based on a characteristic amount of an image.

In this embodiment, it is intended to prevent deterioration of image quality when an edge moves in a moving image.

FIGS. 12A-12D are schematic diagrams representing states of data processing with a moving image. Pixel blocks of FIG. 12A, FIG. 12B represent pixel blocks before and after one frame, namely, a moving image, and the pixel block of FIG. 12B is in relation of shifting the pixel block of FIG. 12A by one pixel rightward. The pixel blocks of FIG. 12A, FIG. 12B are processed to generate pixel blocks of FIG. 12C, FIG. 12D. In this example, processing of making representative values is performed at two levels.

Although the pixel blocks of FIG. 12C, FIG. 12D are shifted rightward by one pixel originally, shifting of an edge does not occur since the average values of the blocks became large. Moreover, the luminances changed temporally. As a result, the moving image after the processing becomes very unnatural.

From the above, it can be seen that, in the case of a moving image, there is a possibility that one that has to be recognized as movement on an image appears as a temporal change of luminance. On the other hand, on a still image, when a luminance changes before and after processing, it will not be recognized as a temporal change, and hence it is difficult to recognize the difference of luminance.

From the above, in the case of a moving image, it can be seen that it is preferable to make the number of segments larger than in the case of a still image.

The image data transmitting unit 310, which transmits image data, has an image generating unit 111, a color space converting unit 112, an image dividing unit 113, a segment number deciding unit 321, a sub-sample unit 322, a segment threshold deciding unit 314, a representative value deciding unit 315, an arrangement pattern generating unit 316, and a transmitting unit 317.

The image data receiving unit 330, which receives and displays image data, has a receiving unit 331, a pixel block reproducing unit 332, an image reproducing unit 133, a color space converting unit 134, a display driving unit 135, and a display unit 136.

The segment number deciding unit 321 decides the number of segments for classifying pixels based on spatial and temporal variations of luminances of pixels in a pixel block. Here, an intra-field difference sum and an inter-field difference sum are used respectively for the spatial, temporal variations of luminances of pixels. Note that details thereof will be explained later.

The sub-sample unit 322 sub-sample processes chrominances Cb, Cr.

The segment threshold deciding unit 314 decides a threshold for classifying pixels in a pixel block into plural segments corresponding to the number of segments.

The representative value deciding unit 315 decides a representative value in each of the plural segments of the pixel block corresponding to the number of segments.

The arrangement pattern generating unit 316 generates an arrangement pattern representing an arrangement of the representative values in the pixel block corresponding to the number of segments.

The transmitting unit 317 transmits the number of segments, the representative values, and the arrangement pattern.

The receiving unit 331 receives the number of segments, the representative values, and the arrangement pattern from the transmitting unit 317.

The pixel block reproducing unit 332 reproduces a pixel block from the number of segments, the representative values, and the arrangement pattern received by the receiving unit 331.

The image generating unit 111, the color space converting unit 112, the image dividing unit 113, the image reproducing unit 133, the color space converting unit 134, the display driving unit 135, and the display unit 136 are not practically different from those in the first embodiment, and hence detailed explanation thereof is omitted.

(Operations of the Image Display Device 300)

Figure 13:
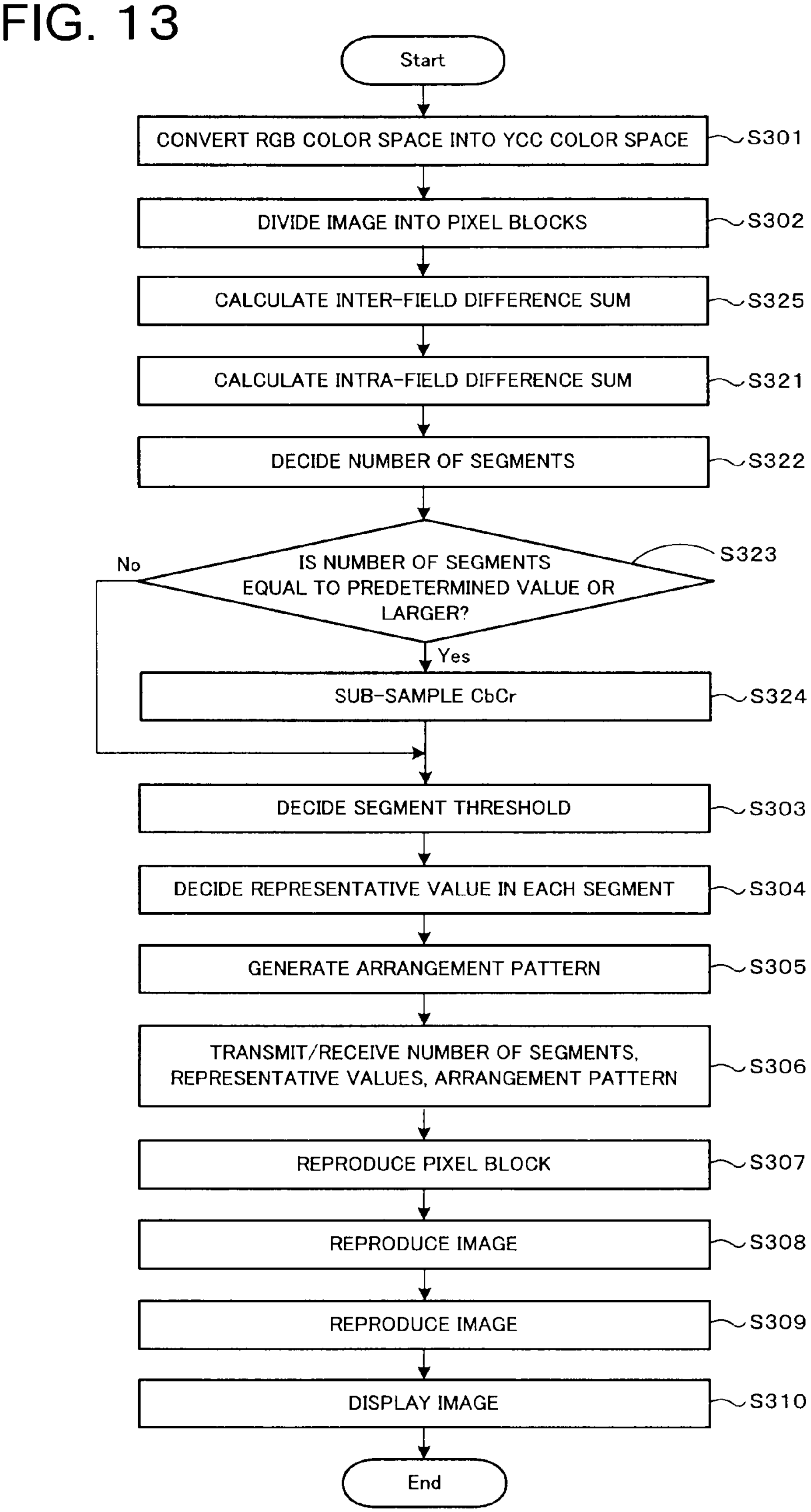
FIG. 13 is a flowchart representing an example of an operation procedure of the image display device.
Figure 14:
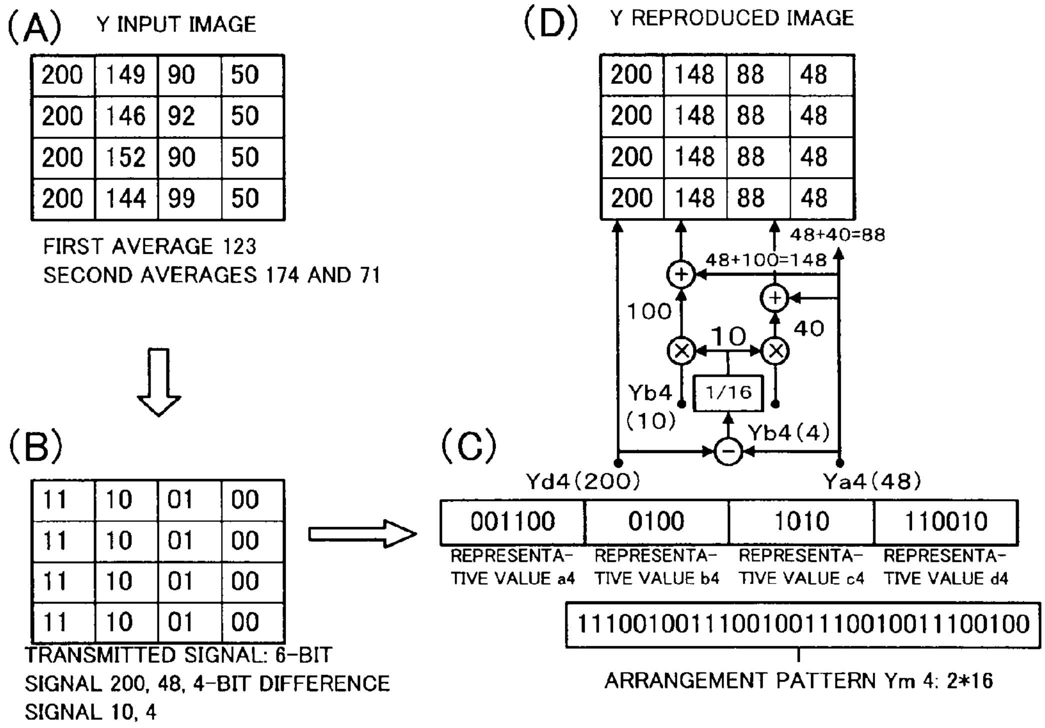
FIG. 14 is a schematic diagram representing an example of image data processed by the image display device.
Figure 15:
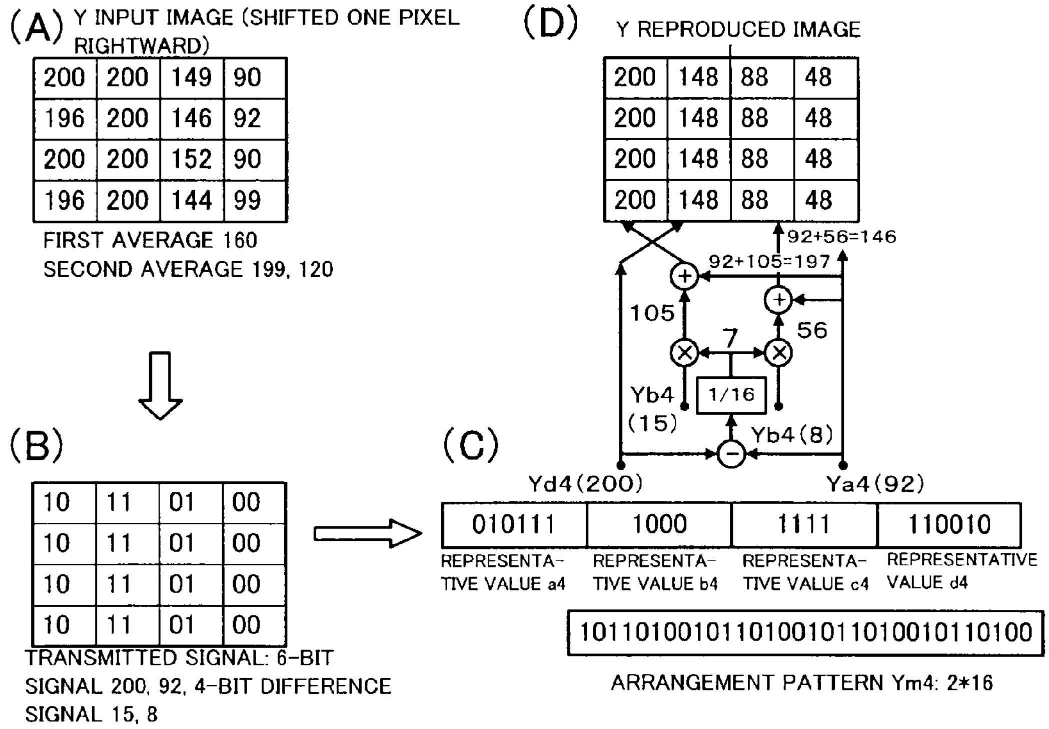
FIG. 15 is a schematic diagram representing an example of image data processed by the image display device.

Operations of the image display device 300 will be explained. FIG. 13 is a flowchart representing an example of an operation procedure of the image display device 300. FIG. 14, FIG. 15 are schematic diagrams representing examples of image data processed by the image display device 300. FIG. 14, FIG. 15 represent pixel blocks which are different by one frame respectively, and the pixel block of FIG. 15 is in relation of shifting the pixel block of FIG. 14 by one pixel rightward.

(1) Converting the Color Space, Dividing an Image into Blocks (Steps S301, S302)

The color space converting unit 112 converts the color space of an image signal outputted from the image generating unit 111 from RGB color space into YCbCr color space. Further, the image dividing unit 113 divides the image with the color space converted in the color space converting unit 112 into plural blocks (pixel blocks). An example of the pixel blocks is shown in FIG. 14(A), FIG. 15(A).

(2) Calculating the Inter-Field Difference Sum and the Intra-Field Difference Sum and Deciding the Number of Segments (Steps S325, S321, S322)

The segment number deciding unit 321 calculates the inter-field difference sum and the intra-field difference sum and decides the number of segments for classifying pixels among two to four.

The inter-field difference sum St means a total sum of differences of luminances of pixels before and after one field. The inter-field difference sum is a kind of characteristic amount of an image, and can be used as a parameter for representing a variation (temporal variation) of an edge in a moving image.

In the example of FIG. 14(A), FIG. 15(A), the inter-field difference sum St is calculated as follows.

$$St=(|120-200|+|149-200|+|90-149|+|50-90|+ - - - +|200-200|+|144-200|+|99{''}144|+|50-99|)/16$$

The number of segments is decided from the inter-field difference sum and the intra-field difference sum as follows.

1) When the Inter-Field Difference Sum is Smaller than a Predetermined Value (Threshold 1)

In this case, the number of segments is decided by the intra-field difference sum. Specifically, when the intra-field difference sum is smaller than a predetermined value (threshold 2), the number of divisions is set to two, and when the intra-field difference sum is equal to a predetermined value (threshold 2) or larger, the number of divisions is set to three.

2) When the Inter-Field Difference Sum is Equal to a Predetermined Value (Threshold 1) or Larger In this case, the number of segments is set to four.

(3) Sub-Sampling of the Chrominances (Steps S323, S324)

When the number of representatives is equal to a predetermined value (for example, three) or larger, the chrominances Cr, Cb are sub-sampled.

(4) Deciding the Segment Threshold (Step S303)

The segment threshold deciding unit 314 decides by linear calculation the threshold for classifying pixels in a pixel block into plural segments according to the number of segments.

1) When the Number of Segments is Two or Three

Description is omitted since it is the same as in the second embodiment.

2) When the Number of Segments is Four

Figure 16:
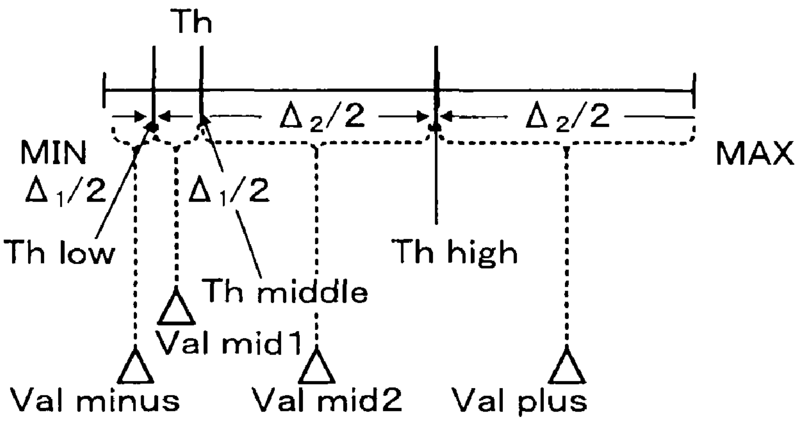
FIG. 16 is a diagram showing an example of a method of calculating thresholds and representative values.

A method of calculating thresholds $Th_{low}$, $Th_{middle}$, $Th_{high}$ and representative values when the number of segments is four is shown in FIG. 16.

With the average value of luminances or the like of pixels in a pixel block being taken as the threshold $Th_{middle}$, the pixels in the pixel block are divided in two (segments A1, A2). The average values of luminances or the like of the pixels in the segments A1, A2 respectively are taken as the thresholds $Th_{low}$, $Th_{high}$. The pixels in the pixel block can be divided into four (segments C1 to C4) by these thresholds $Th_{low}$, $Th_{middle}$, $Th_{high}$.

(5) Deciding the Representative Value in each Segment (Step S304)

The representative value deciding unit 315 decides the representative value in each of the plural segments of the pixel block according to the number of segments.

1) When the Number of Segments is Two or Three

Description is omitted since it is the same as in the second embodiment.

2) When the Number of Segments is Four

The averages of luminances in the segments C1 to C4 are taken as representative values $Val_{minus}$, $Val_{mid}$1, $Val_{mid}$2, $Val_{plus}$, respectively.

(6) Generating the Arrangement Pattern (Step S305)

The arrangement pattern generating unit 316 generates the arrangement pattern representing an arrangement of the representative values in the pixel block according to the number of segments. This generation is done almost at the same time as (in parallel to) deciding of the representative values.

The arrangement patterns generated corresponding to the pixel blocks of FIG. 14(A), FIG. 15(A) are shown in FIG. 14(B), FIG. 15(B). Since there are four segments, whether corresponding to each of the four representative values or not is represented by two bits (00, 01, 10, 11) on a map.

(7) Transmitting/Receiving the Number of Segments, the Representative Values, and the Arrangement Pattern (Step S306).

The transmitting unit 317 transmits the number of segments, the representative values, and the arrangement pattern, which are received by the receiving unit 331. The representative values and the arrangement patterns transmitted/received corresponding to the pixel blocks of FIG. 14(A), FIG. 15(A) are represented in FIG. 14(C), FIG. 15(C). Note that although description of the number of segments is omitted here, the number of segments is also an object to be transmitted/received in practice.

The four representative values are represented by 6, 4, 4, 6 bits, and the arrangement pattern is represented by 2*16 bits. Here, the largest value and the smallest value of a representative value are changed from eight-bit display to six-bit display. Further, an intermediate value therebetween is linearly quantized by four bits. Specifically, a value between the largest value and the smallest value of representative values is represented by four bits. This is equivalent to that the difference between an intermediate value and a smallest value is represented by four bits. Considering that the largest value and the smallest value among representative values more largely influence the visibility than an intermediate value, increase of the data amount is prevented while improving the precision.

(8) Reproducing a Pixel Block (Step S307)

The pixel block reproducing unit 332 reproduces a pixel block from the number of segments, the representative values, and the arrangement pattern received by the receiving unit 331. FIG. 14(D), FIG. 15(D) represent pixel blocks reproduced corresponding to the original pixel blocks of FIG. 14(A), FIG. 15(A). By linear calculation of the received data, the original representative values are reproduced.

(9) Reproducing an Image, Converting the Color Space, and Displaying the Image (Steps S308 to S310)

There is no difference from the first embodiment in reproducing an image, converting the color space, and displaying the image, and hence explanation thereof is omitted.

FIGS. 17A-17D, which corresponds to FIGS. 12A-12D, are schematic diagrams representing states of data processing with a moving image. In this example, processing of making representative values is performed at four levels. In the pixel blocks of FIG. 17C, FIG. 17D, being different from FIGS. 12A-12D, the temporal variation of luminance values is eliminated, and the moving image after processing becomes natural.

Fourth Embodiment

The image display device 400 according to a fourth embodiment of the present invention is different from the third embodiment in the method of deciding the number of segments in the segment number deciding unit 321.

In this embodiment, the number of segments is decided from the inter-field difference sum and the intra-field difference sum as follows.

1) The inter-field difference sum St and the intra-field difference sum Sp are added to calculate a total difference sum (activity amount) S1 (=St+Sp).

2) When the total difference sum S1 is smaller than a first threshold Th1, the number of segments becomes two (S1<Th1).

3) When the total difference sum S1 is equal to the first threshold Th1 or larger and smaller than a second threshold Th2, the number of segments becomes three (Th1≦S1<Th2).

4) When the total difference sum S1 is equal to the second threshold Th2 or larger, the number of segments becomes four (Th2≦S1).

In the third embodiment, four was selected as the number of segments just by the inter-field difference. This means to give greater importance to temporal variation (movement) of an image. In comparison, in this embodiment, greater importance is given to both temporal variation (movement) and spatial variation (spatial frequency) of an image by adding the inter-field difference sum St and the intra-field difference sum Sp, to thereby select four as the number of segments. In this manner, four as the number of segments can be selected for a still image with a high spatial frequency, and thereby blur can be reduced in a still image with a high spatial frequency.

Fifth Embodiment

Figure 18:
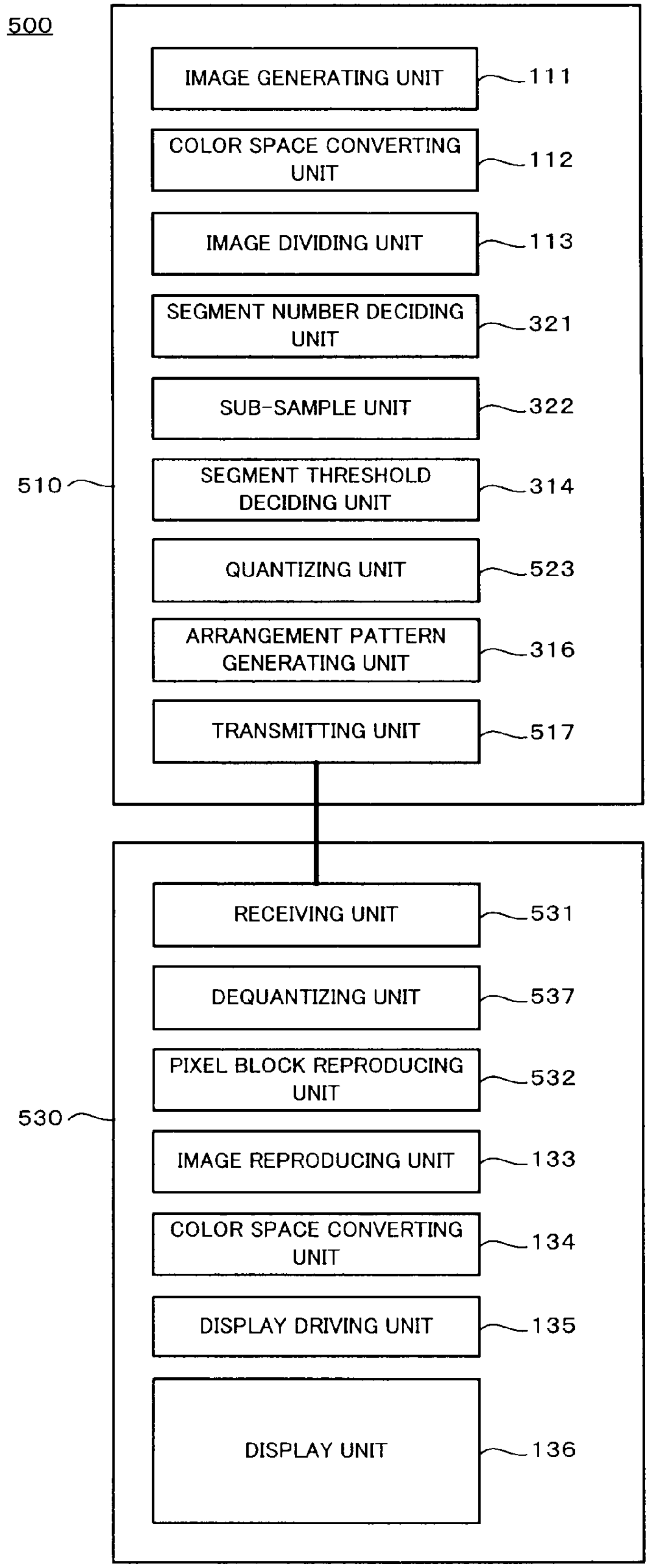
FIG. 18 is a block diagram representing an image display device according to a fifth embodiment.

FIG. 18 is a block diagram representing an image display device 500 according to a fifth embodiment of the present invention. The image display device 500, which displays an image, has an image data transmitting unit 510 and an image data receiving unit 530.

The image data transmitting unit 510, which transmits image data, has an image generating unit 111, a color space converting unit 112, an image dividing unit 113, a segment number deciding unit 321, a sub-sample unit 322, a segment threshold deciding unit 314, a representative value deciding unit 315, a quantizing unit 523, an arrangement pattern generating unit 316, and a transmitting unit 517.

The image data receiving unit 530, which receives and displays image data, has a receiving unit 531, a dequantizing unit 537, a pixel block reproducing unit 532, an image reproducing unit 133, a color space converting unit 134, a display driving unit 135, and a display unit 136.

The quantizing unit 523 retains a predetermined quantization table and quantizes a representative value.

The transmitting unit 517 transmits the number of segments, quantized representative values, and an arrangement pattern.

The receiving unit 531 receives the number of segments, the quantized representative values, and the arrangement pattern from the transmitting unit 517.

The dequantizing unit 537 retains a predetermined dequantization table and dequantizes the quantized representative values received by the receiving unit 531.

The pixel block reproducing unit 532 reproduces a pixel block from the number of segments, the representative values, and the arrangement pattern.

The other components are not practically different from those in the third embodiment, and hence detailed explanation thereof is omitted.

(Operations of the Image Display Device 500)

Figure 19:
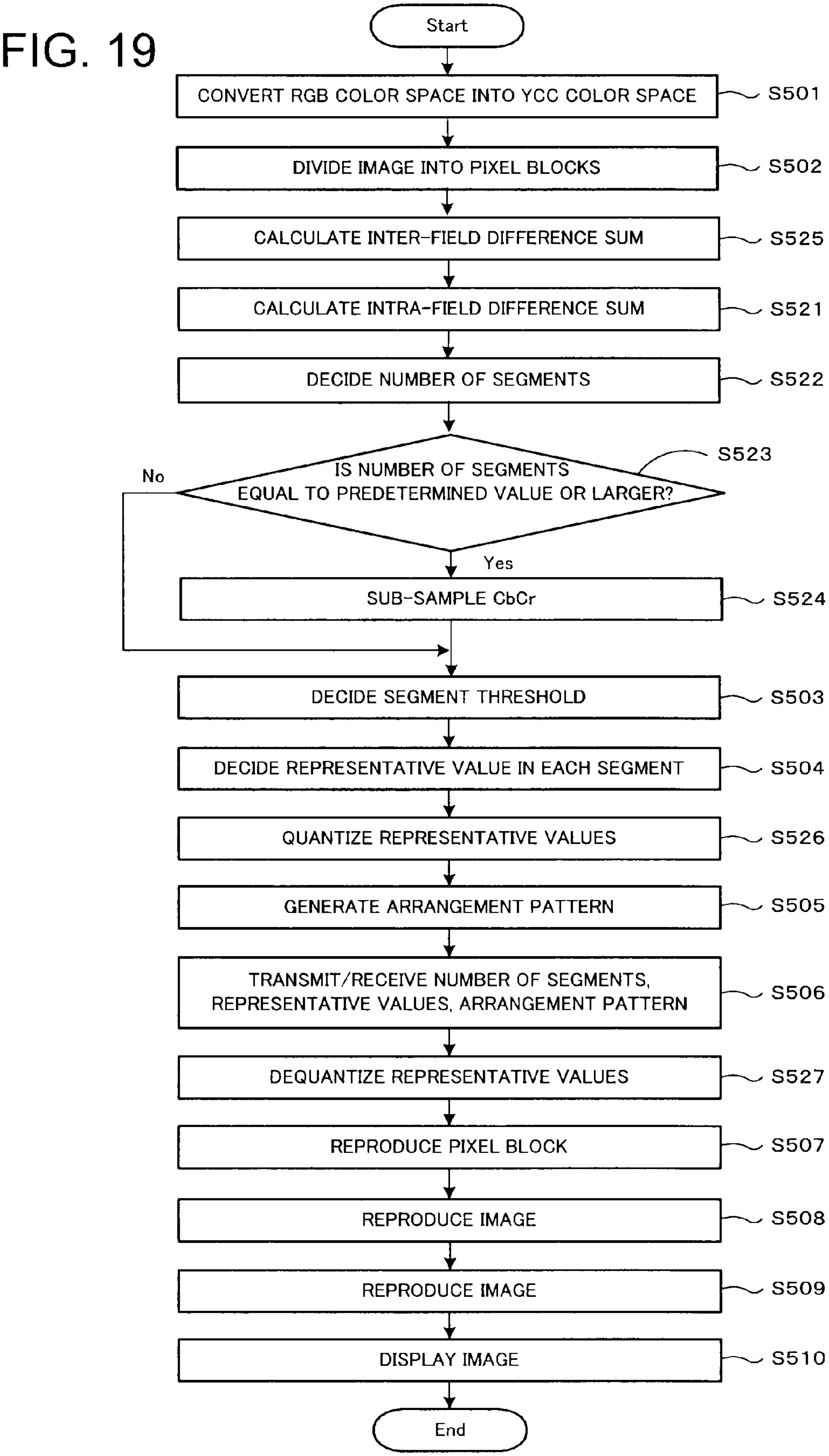
FIG. 19 is a flowchart representing an example of an operation procedure of the image display device.

Operations of the image display device 500 will be explained. FIG. 19 is a flowchart representing an example of an operation procedure of the image display device 500. This embodiment is different from the third embodiment in that the representative values are quantized and then transmitted, and the received quantized representative values are dequantized. Hereinafter, practically different points from the third embodiment will be explained.

(1) The Quantizing Unit 523 Quantizes Representative Values (Step S526).

For three or more representative values, one value (reference value) is quantized as it is, and for the other values, a difference from the reference value is quantized. For quantization of the difference, non-linear quantization is used. Specifically, when the difference is small, occurrence probability is large and thus the quantization is done finely. Then, as the difference gets larger, the quantization is done more coarsely. This is because there is a correlation between values of pixels in the same pixel block (a moving image in particular has a high correlation).

Details of the quantization will be explained for four representative values (smallest representative value a, first, second intermediate representative values b, c, largest representative value d).

The first intermediate value b (second smallest value among the four representative values) is taken as the reference value. This first intermediate value b is quantized by eight bits. Specifically, data of the first intermediate value b is not compressed. However, the data may be quantized as appropriate (for example, to be a six-bit representation).

For the values a, c, d other than the first intermediate value b, the absolute values ((b−a), (c−b), (d−b)) of differences from the reference value b are non-linearly quantized. This non-linear quantization is sufficient by, for example, four bits. This is because the amount to be quantized (absolute value of a difference) becomes a positive number. An example of the quantization table for non-linear quantization is shown in FIG. 20. (2) The number of segments, the quantized representative values, and the arrangement patterns are transmitted and received, and the dequantizing unit 537 dequantizes the quantized representative values (steps S506, S527). The dequantizing unit 537 has a dequantization table corresponding to the quantization table of the quantizing unit 523.

In other aspects, this embodiment has no practical differences from the third embodiment, and hence detailed explanation thereof is omitted.

Sixth Embodiment

Here, the quantizing unit 523 retains plural non-linear quantization tables, and may switch among the quantization tables according to the amount of difference to be quantized. Note that switching of the quantization table is equivalent to that the quantizing unit 523 has plural quantizers and perform switching of these quantizers.

Figure 22:
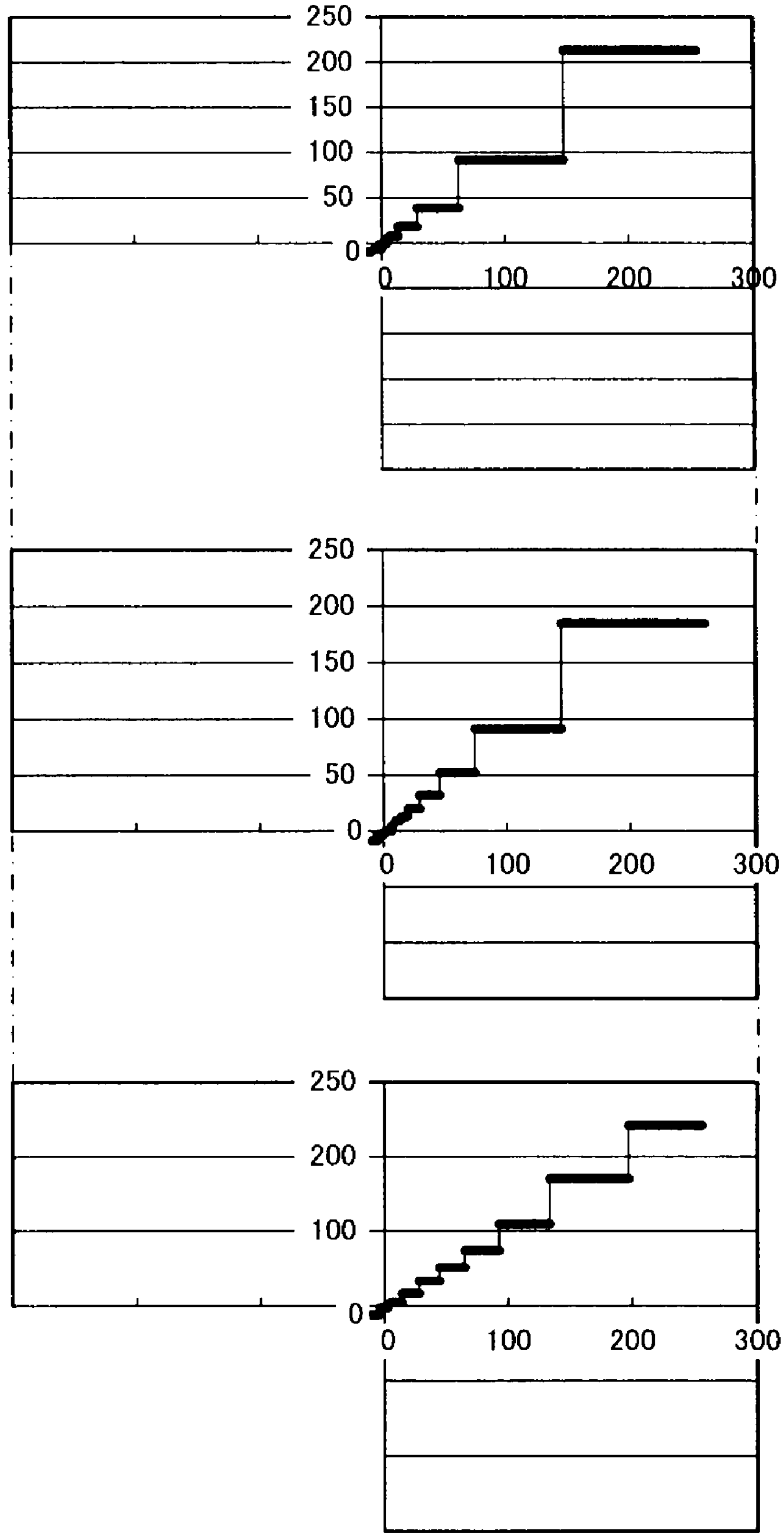
FIG. 22 is a schematic diagram representing an example of a combination of quantization tables.

FIG. 21, FIG. 22 are schematic diagrams representing two as one group and three as one group of non-linear quantization tables, respectively. In FIG. 21, for example, the quantization table of FIG. 21(A) is used for quantizing the differences (a−b), (a−c), and the quantization table of FIG. 21(B) is used for quantizing the difference (a−d). In FIG. 22, for example, the quantization table of FIG. 22(A) is used for quantizing the difference (a−b), the quantization table of FIG. 22(B) is used for quantizing the difference (a−c), and the quantization table of FIG. 22(C) is used for quantizing the difference (a−d).

Further, the quantizing unit 523 retains plural groups of quantization tables, and may switch among the groups of quantization tables based on a characteristic amount (for example, the intra-frame difference sum Sp) in a pixel block. For example, depending on whether the characteristic amount surpasses a predetermined threshold or not, one is selected from sets A to C of quantization tables each including one to three quantization tables.

For example, the set of quantization tables is decided from a characteristic amount S as follows.

1) When the characteristic amount S is smaller than a first threshold Th1, a set A of quantization tables (number of tables: 1) is selected (S<Th1).

2) When the characteristic amount S is equal to the first threshold Th1 or larger and smaller than a second threshold Th2, a set B of quantization tables is selected (Th1=<S<Th2).

3) When the characteristic amount S is equal to the second threshold Th2 or larger, a set C of quantization tables (number of tables: 3) is selected (Th2≦S).

The first intermediate value b (second smallest value among the four representative values) is taken as a reference value. This first intermediate value b is quantized by eight bits. For the other values a, c, d, absolute values ((b−a), (c−b), (d−b)) of differences from the reference value b are non-linearly quantized with the selected set of quantization tables.

1) When the set A of quantization tables (number of tables: 1) is selected

All the absolute values of the difference values ((b−a), (c−b), (d−b)) are quantized with a same quantization table.

2) When the set B of quantization tables (number of tables: 2) is selected

Two of the absolute values of the difference values ((b−a), (c−b)) are quantized with a first quantization table, and the remaining one (d−b) is quantized by a second quantization table.

3) When the set C of quantization tables (number of tables: 3) is selected

The absolute values of the difference values ((b−a), (c−b), (d−b)) are quantized with different quantization tables, respectively.

An identifier for identifying which set of quantization tables is used is transmitted by two bits. The dequantizing unit 537 retains the sets A to C of quantization tables, too, and selects a set of quantization tables by the identifier to dequantize the representative values. In this case, the identifier is of two bits, and increase of bits is small.

Seventh Embodiment

In this embodiment, details of quantization will be explained for four representative values (smallest representative value a, first, second intermediate representative values b, c, largest representative value d).

The smallest representative value a and the largest representative value dare non-linearly quantized by six bits. This is because the smallest representative value a and the largest representative value d often become 128 bits or larger and 128 bits or smaller respectively in the case of eight bits. Further, the first, second intermediate representative values b represent differences (b−a), (d−a) by four bits.

Here, it is conceivable to change the method of quantization for a luminance and a chrominance. For example, a chrominance is quantized as follows. The smallest representative value a and the largest representative value d of the chrominance are non-linearly quantized by five bits. For the first and second intermediate representative values b of the chrominance, the differences (b−a), (d−a) are represented by four bits.

Eighth Embodiment

Figure 23:
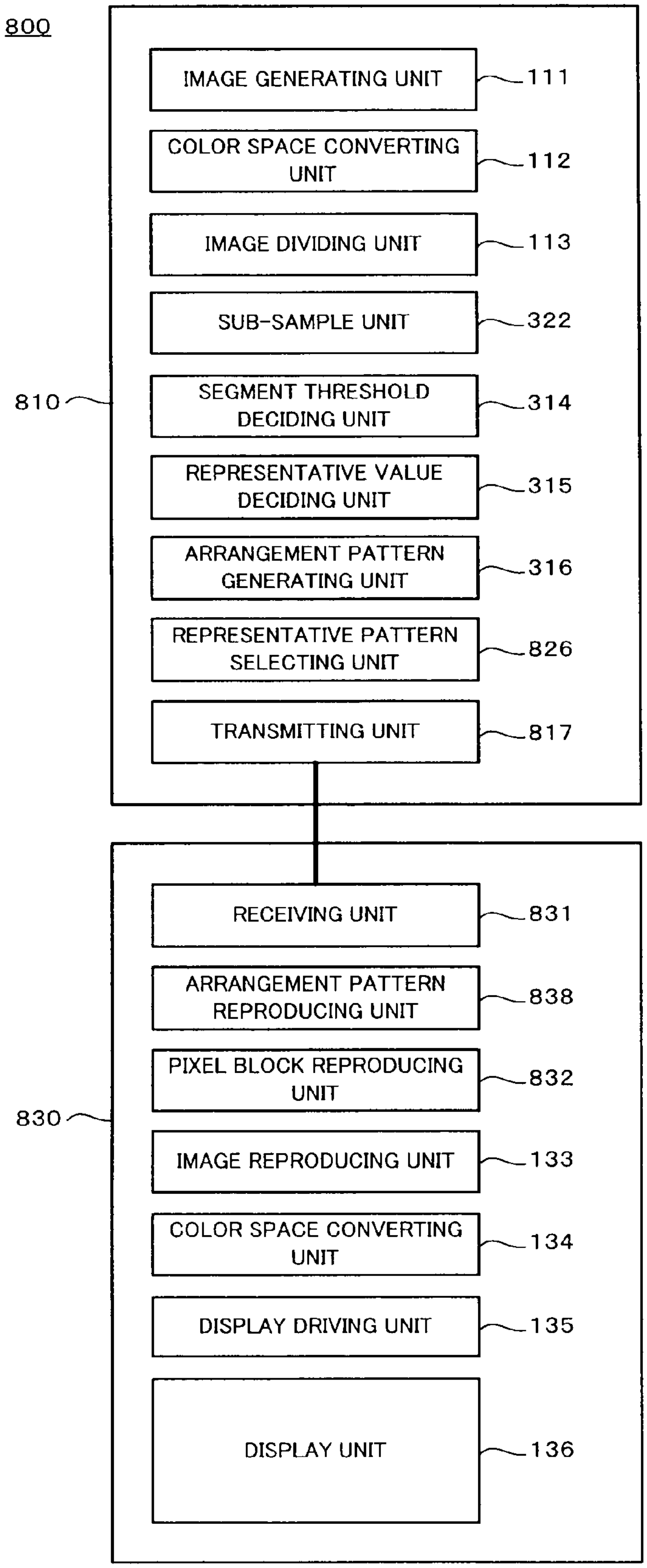
FIG. 23 is a block diagram representing an image display device according to an eighth embodiment.

FIG. 23 is a block diagram representing an image display device 800 according to an eighth embodiment of the present invention. The image display device 800, which displays an image, has an image data transmitting unit 810 and an image data receiving unit 830.

The image data transmitting unit 810, which transmits image data, has an image generating unit 111, a color space converting unit 112, an image dividing unit 113, a sub-sample unit 322, a segment threshold deciding unit 314, a representative value deciding unit 315, an arrangement pattern generating unit 316, a representative pattern selecting unit 826, and a transmitting unit 817. Note that the image data transmitting unit 810 does not have an element corresponding to the segment number deciding unit 321 because it is assumed that the number of divisions is fixed ("two").

The image data receiving unit 830, which receives and displays image data, has a receiving unit 831, an arrangement pattern reproducing unit 838, a pixel block reproducing unit 832, an image reproducing unit 133, a color space converting unit 134, a display driving unit 135, and a display unit 136.

The representative pattern selecting unit 826 retains plural representative patterns and outputs an identifier (pattern identifier) for a representative pattern having a largest correlation with an arrangement pattern.

The transmitting unit 817 transmits a representative value and a pattern identifier.

The receiving unit 831 receives the representative value and the pattern identifier from the transmitting unit 817.

The arrangement pattern reproducing unit 838 retains plural representative patterns and reproduces an arrangement pattern based on the pattern identifier.

The pixel block reproducing unit 832 reproduces a pixel block from the number of segments, the representative value, and the reproduced arrangement pattern. The other components are not practically different from those in the third embodiment, and hence detailed explanation thereof is omitted.

(Operations of the Image Display Device 800)

Figure 24:
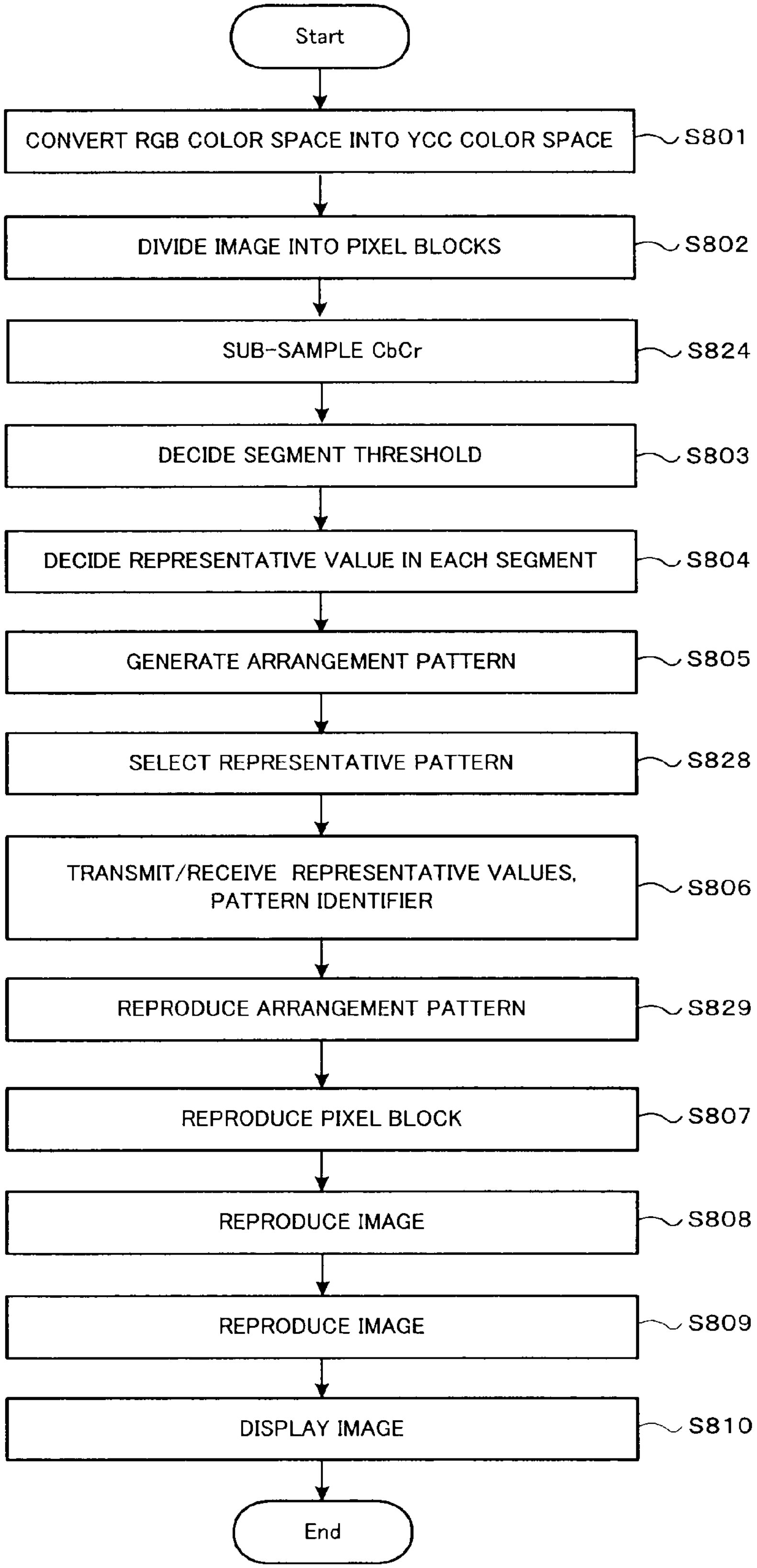
FIG. 24 is a flowchart representing an example of an operation procedure of the image display device.

Operations of the image display device 800 will be explained. FIG. 24 is a flowchart representing an example of an operation procedure of the image display device 800. Further, FIGS. 25A-25F are schematic diagrams representing an example of image data processed by the image display device 800.

In this embodiment, the data amount for transmitting/receiving an arrangement pattern can be reduced. For the representative pattern, for example, 16 arrangement patterns with a high occurrence frequency are prepared. By transmitting/receiving the pattern identifier instead of the arrangement pattern, the 16 bits can be reduced to four bits (corresponding to the number (16) of representative patterns).

(1) Selecting a Representative Pattern (Step S828)

The representative pattern selecting unit 826 selects a representative pattern.

Figures 26, 27:
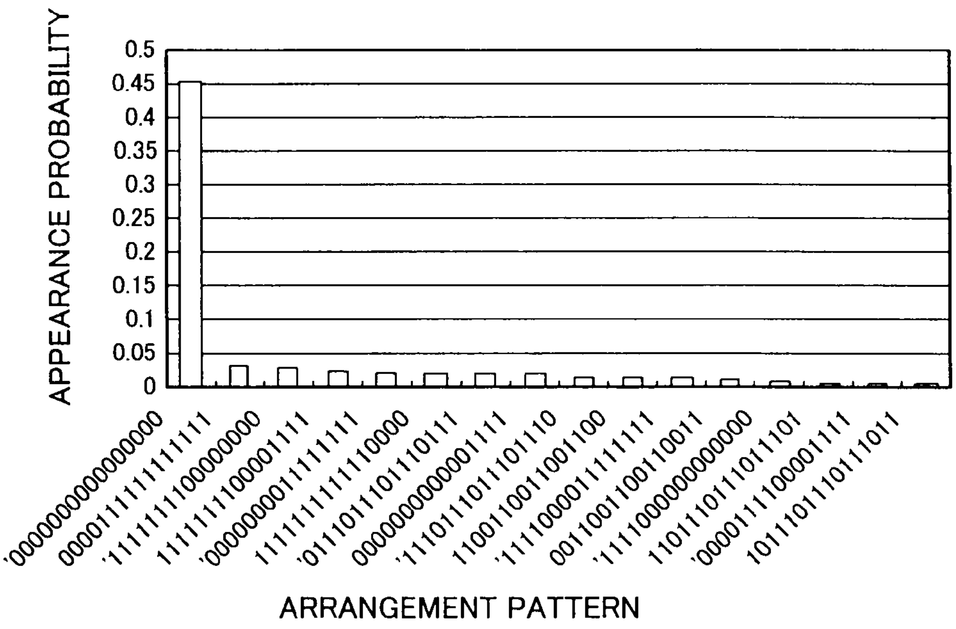
FIG. 26 is a schematic diagram representing an example of a representative pattern.
FIG. 27 is a schematic diagram representing an example of a representative pattern.

An example of the representative patterns is shown in FIG. 26, FIG. 27. Arrangement patterns which occur are obtained experimentally, and 16 arrangement patterns are prepared in advance in the descending order of frequencies of occurrence. By preparing the representative patterns in advance, processing can be accelerated. Code values (pattern identifier) for identifying them from each other correspond to the representative patterns.

A correlation Rc between a representative map and an arrangement pattern can be calculated as follows.

$$Rc=\sqrt{(\Sigma(A1-B1)^2)}$$

A1, B1 mean display values (luminances or the like) of pixels to which the representative map and the arrangement pattern correspond respectively. The correlation Rc can be defined as a distance between the representative map and the arrangement pattern.

A representative map having the smallest correlation Rc with the arrangement patterns is selected.

(2) Reproducing an Arrangement Pattern (Step S829)

The arrangement pattern reproducing unit 838 retains plural representative patterns, and reproduces an arrangement pattern based on the pattern identifier.

In other aspects, this embodiment has no practical differences from the third embodiment except that the number of segments is fixed, and hence detailed explanation thereof is omitted.

As above, according to the first to eighth embodiments, the data amount to be transmitted/received is reduced, and the frequency of transmitting an image can be reduced to the half or smaller. Thus, the power consumption or EMI of a display device can be reduced. Further, the data amount to be transmitted/received can be reduced to ⅓ or smaller by selecting representative patterns with a high frequency in advance and selecting a pattern therefrom by a degree of similarity.

The case where the image data receiving unit 130 is of self-refresh method will be considered. In the self-refresh method, the image data receiving unit 130 has a memory, and an image is refreshed using data of the image retained in the memory. At this time, it is preferable that the pixel block reproducing unit 132, the image reproducing unit 133, and the color space converting unit 134 are structured integrally as a display driver with the display driving unit 135 (one-chip semiconductor element), and a memory is provided therein.

The case where the display driver has a memory inside (including a memory) and the case where it does not have a memory (memory is externally added) were compared for power consumption, and the former consumed lower power. By including the memory in the display driver, both the power consumption by communication between the display driver and the memory and the power consumption in the memory can be reduced. Consequently, the effectiveness of reducing the power consumption by reducing data becomes large. In the case of the self-refresh method, for example, it is possible that power consumption is necessary for decoding a compressed moving image (reproducing a pixel block and an image). By decoding in the display driver, lowering of power consumption can be realized also for a moving image.

Further, since the data amount of the image itself is reduced, the capacity of memory is lowered, and the cost thereof can be reduced. Specifically, transmitted data (representative values, arrangement patterns, and/or the like) are retained in the memory, and an image is decoded from the data retained in the memory. Also in this case, structuring of the display driver and the memory integrally leads to lowering of power consumption.

Other Embodiments

In the foregoing, the embodiments of the present invention have been explained. The present invention is not limited to these embodiments, and can be modified and implemented in various ways within the range not departing from the spirit thereof.

The present invention is not limited to liquid display devices, and is applicable to all kinds of display devices displayed in a matrix form, such as organic ELs and PDPs.

As has been described above, it is possible to display a good image by setting pixels of a pixel block to 4*4 and representing these pixels by a small number of representative values. This is because close pixels in the vicinity have similar properties and pixel values.

Simulation was performed about how many segments are required for the case of 4*4 pixels. An influence of presence/absence of a sub-sample of chrominance C (¼ sub-sample) was also considered. Results thereof are shown in FIG. 28.

When there is no sub-sample, S/N ratios of 27 dB, 32 dB, 40 dB were obtained with the number of segments being two to four, respectively. Specifically, when four representative values (levels) corresponding to ¼ of 16 pixels of 4*4 are present, an S/N ratio of 40 dB or larger can be obtained. Further, even with three representative values (levels) corresponding to 3/16 of 16 pixels, an S/N ratio of 30 dB level can be obtained. In short, it was found that sufficient image quality can be obtained by representation by pixel values of approximately ¼ of pixels at the maximum in the entire block.

Thus, when processing is performed in units of 4*4 blocks, three or four representative value allows to obtain sufficient image quality. Considering in more detail, it has been found that a sufficient S/N can be obtained when there is two or more levels of representative values for a still image of a natural image, and three to four levels or more for a complicated image such as a character, an OA image, and a moving image.

In addition, for the case where 8*8 pixels are taken as one block, it has been found that substitution by a representative value of 16 corresponding to ¼ thereof or by a representative value of 12 corresponding to 3/16 is possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data processing system, comprising:
- an extracting unit extracting a signal from an image signal corresponding to one image, the signal corresponding to a pixel block including plural pixels in the image;
- a segment number deciding unit deciding the number of segments based on a spatial or temporal variation of display values of the plural pixels;
- a threshold calculating unit calculating one or more number of thresholds, corresponding to the number of segments decided by the segment number deciding unit, for classifying the plural pixels into plural segments by linear calculation of display values of the plural pixels;
- a representative value calculating unit calculating plural representative values corresponding to the plural segments based on the one or more number of thresholds;
- a generating unit generating an arrangement pattern representing an arrangement of the representative values in the pixel block; and
- a transmitting unit transmitting the representative values and the arrangement pattern.

2. The system according to claim 1, wherein the segment number deciding unit decides the number of segments based on whether the temporal variation of the display values exceeds a first predetermined amount or not.

3. The system according to claim 2, wherein when the temporal variation of the display values does not exceed the first predetermined amount, the segment number deciding unit decides the number of segments based on whether the spatial variation of the display values exceeds a second predetermined amount or not.

4. The system according to claim 1, wherein the segment number deciding unit decides the number of segments based on a sum of the temporal variation of the display values and a spatial variation of the display values.

5. The system according to claim 1, further comprising selecting unit selecting an arrangement pattern approximating to the arrangement pattern generated in the generating unit from predetermined plural arrangement patterns, wherein the transmitting unit transmits the representative values and an identifier of the arrangement pattern selected by the selecting unit.

6. The system according to claim 1, further comprising:

a receiving unit receiving the representative values and the arrangement pattern;

a pixel block reproducing unit reproducing a signal corresponding to the pixel block using the representative values and the arrangement pattern received by the receiving unit;

an image reproducing unit reproducing the image signal using the signal reproduced in the reproducing unit; and a display unit displaying an image corresponding to the image signal reproduced in the image reproducing unit.

7. An image data processing system, comprising:

an extracting unit extracting a signal from an image signal corresponding to one image, the signal corresponding to a pixel block including plural pixels in the image;

a threshold calculating unit calculating a threshold for classifying the plural pixels into plural segments by linear calculation of display values of the plural pixels;

a representative value calculating unit calculating plural representative values corresponding to the plural segments based on the threshold;

a generating unit generating an arrangement pattern representing an arrangement of the representative values in the pixel block;

a quantizing unit quantizing at least either of the plural representative values calculated by the representative value calculating unit and differences of the plural representative values; and a transmitting unit transmitting at least either of the plural representative values quantized in the quantizing unit and differences of the plural representative values and the arrangement pattern generated in the generating unit.

8. The system according to claim 7, wherein the representative values calculated by the representative value calculating unit include smallest first and largest second representative values and a third representative value in middle of the first, second representative values, respectively, wherein the quantizing unit has a first quantizer quantizing the first, second representative values, and a second quantizer quantizing the third representative value with the first, second representative values being references, and the transmitting unit transmits the first, second representative values quantized in the first quantizing unit, the third representative value quantized in the second quantizing unit, and the arrangement pattern generated in the generating unit.

9. An image data processing method, comprising using a processor to perform the steps of:

extracting from an image signal corresponding to one image a signal corresponding to a pixel block including plural pixels in the image;

deciding the number of segments based on a spatial or temporal variation of display values of the plural pixels;

calculating one or more number of thresholds, corresponding to the decided number of segments, for classifying the plural pixels into plural segments by linear calculation of display values of the plural pixels;

calculating plural representative values corresponding to the plural segments based on the one or more number of thresholds;

generating an arrangement pattern representing an arrangement of the representative values in the pixel block; and transmitting the representative values and the arrangement pattern.

10. The method according to claim 9, wherein in the deciding of the number of segments, the number of segments is decided based on whether the temporal variation of the display values exceeds a first predetermined amount or not.

11. The method according to claim 10, wherein when the temporal variation of the display values does not exceed the first predetermined amount, in the deciding of the number of segments, the number of segments is decided based on whether the spatial variation of the display values exceeds a second predetermined amount or not.

12. The method according to claim 9, wherein in the deciding of the number of segments, the number of segments is decided based on a sum of the temporal variation of the display values and a spatial variation of the display values.

13. The method according to claim 9, further comprising the step of quantizing at least either of the calculated plural representative values and differences of the plural representative values, wherein in the transmitting, at least either of the quantized plural representative values and differences of the plural representative values and the generated arrangement pattern are transmitted.

14. The method according to claim 13, wherein the calculated representative values include smallest first and largest second representative values and a third representative value in middle of the first, second representative values, respectively, wherein the quantizing includes quantizing the first, second representative values, and quantizing the third representative value with the first, second representative values being references, and wherein in the transmitting, the quantized first, second representative values, the quantized third representative value, and the generated arrangement pattern are transmitted.

15. The method according to claim 9, further comprising the step of selecting an arrangement pattern approximating to the generated arrangement pattern from predetermined plural arrangement patterns, wherein in the transmitting, the representative values and an identifier of the selected arrangement pattern are transmitted.

16. The method according to claim 9, further comprising the steps of:

receiving the representative values and the arrangement pattern;

reproducing a signal corresponding to the pixel block using the received representative values and the received arrangement pattern;

reproducing the image signal using the reproduced signal; and displaying an image corresponding to the reproduced image signal.

* * * * *